US011163134B2

(12) United States Patent
Yeh et al.

(10) Patent No.: US 11,163,134 B2
(45) Date of Patent: Nov. 2, 2021

(54) IMAGING LENS SYSTEM, IDENTIFICATION MODULE AND ELECTRONIC DEVICE

(71) Applicant: LARGAN PRECISION CO., LTD., Taichung (TW)

(72) Inventors: Kuan-Ting Yeh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 258 days.

(21) Appl. No.: 16/416,056

(22) Filed: May 17, 2019

(65) Prior Publication Data
US 2020/0200997 A1 Jun. 25, 2020

(30) Foreign Application Priority Data
Dec. 20, 2018 (TW) ................. 107146191

(51) Int. Cl.
| *G02B 9/34* | (2006.01) |
| *G02B 7/02* | (2021.01) |
| *G02B 27/09* | (2006.01) |
| *G02B 13/18* | (2006.01) |
| *G02B 13/04* | (2006.01) |
| *G02B 5/00* | (2006.01) |
| *G02B 13/00* | (2006.01) |

(52) U.S. Cl.
CPC .............. *G02B 9/34* (2013.01); *G02B 7/021* (2013.01); *G02B 27/0955* (2013.01); *G02B 5/005* (2013.01); *G02B 13/002* (2013.01); *G02B 13/004* (2013.01); *G02B 13/04* (2013.01); *G02B 13/18* (2013.01)

(58) Field of Classification Search
CPC ........ G02B 13/004; G02B 9/34; G02B 13/18; G02B 13/04; G02B 5/005; G02B 7/021; G02B 3/04; G02B 13/002; G02B 27/0955
USPC .......................... 359/715, 740, 753, 781, 783
See application file for complete search history.

(56) References Cited

U.S. PATENT DOCUMENTS

| 3,778,133 A | 12/1973 | Tatian |
| 4,429,978 A | 2/1984 | Ikari |
| 5,502,592 A | 3/1996 | Jamieson |
| 5,680,259 A | 10/1997 | Yamada |
| 6,154,322 A | 11/2000 | Nakayama |
| 8,089,698 B1 | 1/2012 | Tang et al. |
| 9,354,425 B2 | 5/2016 | Lin et al. |

(Continued)

FOREIGN PATENT DOCUMENTS

| CN | 202093231 U | 12/2011 |
| CN | 104656230 A | 5/2015 |

(Continued)

*Primary Examiner* — Evelyn A Lester
(74) *Attorney, Agent, or Firm* — Maschoff Brennan

(57) ABSTRACT

An imaging lens system includes four lens elements which are, in order from an object side to an image side: a first lens element, a second lens element, a third lens element and a fourth lens element, and each of the four lens elements has an object-side surface facing toward the object side and an image-side surface facing toward the image side. The first lens element has negative refractive power. The fourth lens element has positive refractive power, and the image-side surface of the fourth lens element is convex in a paraxial region thereof. At least one lens element of the imaging lens system has at least one lens surface having at least one inflection point.

28 Claims, 30 Drawing Sheets

(56) References Cited

U.S. PATENT DOCUMENTS

| | | |
|---|---|---|
| 2013/0286484 A1 | 10/2013 | Baba |
| 2014/0153116 A1 | 6/2014 | Kubota et al. |
| 2015/0138331 A1 | 5/2015 | Huang |
| 2015/0177488 A1 | 6/2015 | Kubota et al. |
| 2015/0253542 A1 | 9/2015 | Lin et al. |
| 2016/0062082 A1 | 3/2016 | Engelhardt |
| 2016/0065813 A1 | 3/2016 | Jo |
| 2016/0116704 A1 | 4/2016 | Chen et al. |
| 2016/0116707 A1 | 4/2016 | Chen et al. |
| 2016/0320688 A1 | 11/2016 | Sakagami |
| 2017/0017060 A1 | 1/2017 | Liu et al. |
| 2017/0017061 A1 | 1/2017 | Liu et al. |
| 2017/0102519 A1 | 4/2017 | Kubota et al. |
| 2017/0315326 A1 | 11/2017 | Lai et al. |
| 2017/0315327 A1 | 11/2017 | Lai et al. |
| 2018/0299654 A1 | 10/2018 | Bone et al. |
| 2019/0107689 A1 | 4/2019 | Huang |
| 2019/0121127 A1 | 4/2019 | Jia |
| 2019/0179113 A1 | 6/2019 | Jia |
| 2019/0384038 A1 * | 12/2019 | Liao ............ G02B 13/04 |

FOREIGN PATENT DOCUMENTS

| | | |
|---|---|---|
| CN | 107167901 A | 9/2017 |
| CN | 107340589 A | 11/2017 |
| CN | 110703420 A | 1/2020 |
| JP | H02-208617 A | 8/1990 |
| JP | H04-238312 A | 8/1992 |
| JP | H07-128592 A | 5/1995 |
| JP | H09-15492 A | 1/1997 |
| JP | H09-61710 A | 3/1997 |
| JP | H11-95096 A | 4/1999 |
| JP | H11-305125 A | 11/1999 |
| JP | 2005-249983 A | 9/2005 |
| JP | 2006-301222 A | 11/2006 |
| JP | 2007-279548 A | 10/2007 |
| JP | 2008-164989 A | 7/2008 |
| JP | 2014-106521 A | 6/2014 |
| JP | 2016-038574 A | 3/2016 |
| TW | 201425997 A | 7/2014 |
| WO | 2012/105181 A1 | 8/2012 |
| WO | 2016/021016 A1 | 2/2016 |

* cited by examiner

IMAGING LENS SYSTEM, IDENTIFICATION MODULE AND ELECTRONIC DEVICE

RELATED APPLICATIONS

This application claims priority to Taiwan Application 107146191, filed on Dec. 20, 2018, which is incorporated by reference herein in its entirety.

BACKGROUND

Technical Field

The present disclosure relates to an imaging lens system, an identification module and an electronic device, more particularly to an imaging lens system and an identification module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

The first lens element has negative refractive power. The fourth lens element has positive refractive power. The image-side surface of the fourth lens element is convex in a paraxial region thereof. At least one lens element of the imaging lens system has at least one lens surface having at least one inflection point.

When a central thickness of the first lens element is CT1, a central thickness of the second lens element is CT2, a focal length of the first lens element is f1, and a focal length of the second lens element is f2, the following conditions are satisfied:

$2.35 < CT1/CT2 < 7.50$; and $|f1| < |f2|$.

According to another aspect of the present disclosure, an identification module includes the aforementioned imaging lens system, a panel and an image sensor. The panel is disposed on an object side of the first lens element of the imaging lens system, and an axial distance between the panel and the first lens element is smaller than 0.90 mm. The image sensor is disposed on an image surface of the imaging lens system.

According to another aspect of the present disclosure, an imaging lens system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

The first lens element has negative refractive power. The object-side surface of the first lens element is convex in a paraxial region thereof. The image-side surface of the first lens element is concave in a paraxial region thereof. The fourth lens element has positive refractive power. The image-side surface of the fourth lens element is convex in a paraxial region thereof. At least one lens element of the imaging lens system has at least one lens surface having at least one inflection point.

When a central thickness of the first lens element is CT1, a central thickness of the second lens element is CT2, a focal length of the imaging lens system is f, a focal length of the first lens element is f1, a focal length of the second lens element is f2, and an axial distance between the object-side surface of the first lens element and an image surface is TL, the following conditions are satisfied:

$1.20 < CT1/CT2 < 15.0$;

$|f1| < |f2|$; and $5.50 < TL/f < 16.0$.

According to another aspect of the present disclosure, an identification module includes the aforementioned imaging lens system, a first panel, a second panel and an image sensor. The first panel is disposed on an object side of the first lens element of the imaging lens system. The second panel is disposed on an image side of the fourth lens element of the imaging lens system. The image sensor disposed is on the image surface of the imaging lens system.

When an axial distance between an imaged object and the object-side surface of the first lens element is OL, a central thickness of the first panel is CTf, an axial distance between the image-side surface of the fourth lens element and the image surface is BL, and a central thickness of the second panel is CTr, the following condition is satisfied:

$(OL-CTf)/(BL-CTr) < 1.80$.

According to another aspect of the present disclosure, an imaging lens system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

The first lens element has negative refractive power. The fourth lens element has positive refractive power. At least one lens element of the imaging lens system has at least one lens surface having at least one inflection point.

When a central thickness of the first lens element is CT1, a central thickness of the second lens element is CT2, a focal length of the imaging lens system is f, a focal length of the first lens element is f1, a focal length of the second lens element is f2, an axial distance between the object-side surface of the first lens element and an image surface is TL, and an entrance pupil diameter of the imaging lens system is EPD, the following conditions are satisfied:

$1.20 < CT1/CT2 < 15.0$;

$|f1| < |f2|$;

$5.50<TL/f<14.0$; and $f/EPD<1.90$.

According to another aspect of the present disclosure, an identification module includes the aforementioned imaging lens system, a panel and an image sensor. The panel is disposed on an object side of the first lens element of the imaging lens system. The image sensor is disposed on the image surface of the imaging lens system. When a central thickness of the panel is CTf, and an axial distance between the object-side surface of the first lens element and the image-side surface of the fourth lens element of the imaging lens system is TD, the following condition is satisfied:

$0.35<CTf/TD<0.70$.

According to another aspect of the present disclosure, an electronic device includes the aforementioned identification module. The panel of the identification module is a display module, and the imaging lens system and the display module face the same direction.

According to another aspect of the present disclosure, an identification module includes, in order from an object side to an image side, a panel, an imaging lens system and an image sensor. The imaging lens system includes four lens elements. The four lens elements are, in order from the object side to the image side, a first lens element, a second lens element, a third lens element and a fourth lens element. Each of the four lens elements has an object-side surface facing toward the object side and an image-side surface facing toward the image side.

The first lens element has negative refractive power. The fourth lens element has positive refractive power. At least one lens element of the imaging lens system has at least one lens surface having at least one inflection point, and the image sensor is disposed on an image surface of the imaging lens system.

When a central thickness of the first lens element is CT1, a central thickness of the second lens element is CT2, a focal length of the imaging lens system is f, a focal length of the first lens element is f1, a focal length of the second lens element is f2, an entrance pupil diameter of the imaging lens system is EPD, a curvature radius of the object-side surface of the fourth lens element is R7, a curvature radius of the image-side surface of the fourth lens element is R8, a central thickness of the panel is CTf, and an axial distance between the object-side surface of the first lens element and the image-side surface of the fourth lens element is TD, the following conditions are satisfied:

$1.20<CT1/CT2<15.0$;

$|f1|<|f2|$;

$f/EPD<1.90$;

$-1.0<(R7+R8)/(R7-R8)$; and $0.25<CTf/TD<1.50$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
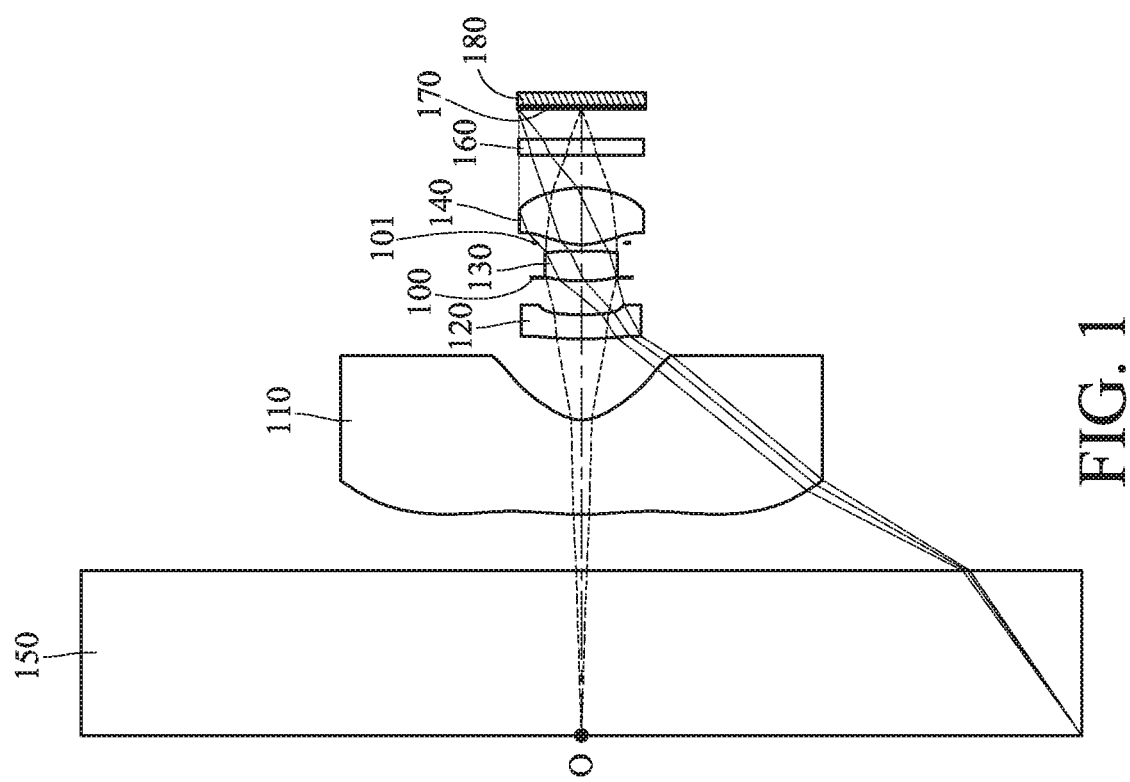
FIG. 1 is a schematic view of an identification module according to the 1st embodiment of the present disclosure.

An identification module includes an imaging lens system, a first panel and a second panel. The imaging lens system includes four lens elements. The four lens elements are, in order from an object side to an image side, a first lens element, a second lens element, a third lens element and a fourth lens element. Each of the four lens elements of the imaging lens system has an object-side surface facing toward the object side and an image-side surface facing toward the image side. The first panel is disposed on the object side of the imaging lens system, and more specifically, the first panel is located between the first lens element of the imaging lens system and an imaged object (which is also on the object side of the first lens element of the imaging lens system). The second panel is disposed on the image side of the imaging lens system, and more specifically, the second panel is located between the fourth lens element and an image surface of the imaging lens system (which is also on the image side of the fourth lens element of the imaging lens system).

The first lens element has negative refractive power. Therefore, it is favorable for the imaging lens system to have a wider detection range so as to improve the accuracy of image identification. The object-side surface of the first lens element can be convex in a paraxial region thereof, and the image-side surface of the first lens element can be concave in a paraxial region thereof. Therefore, it is favorable for preventing total reflection by obtaining a sufficiently large incident angle of light on the lens surfaces so as to allow light with a large view angle can converge on the image surface. The object-side surface of the first lens element can be convex in a paraxial region thereof, and the object-side surface of the first lens element can have a convex-to-concave-to-convex shape change in order from the paraxial region thereof to an off-axis region thereof. Therefore, it is favorable for controlling the required space for the first lens element in the imaging lens system so as to better arrange space among the lens elements, thereby preventing the imaging lens system from being overly large. The object-side surface of the first lens element can have at least one inflection point. Therefore, it is favorable for correcting off-axis aberrations and the miniaturization of the imaging lens system.

The fourth lens element has positive refractive power. Therefore, it is favorable for effectively controlling an incident angle of light on the image surface so as to provide sufficient light on the image surface, thereby increasing illuminance on the peripheral region of the image surface for a better result of the peripheral image identification. The object-side surface of the fourth lens element can be convex in a paraxial region thereof. Therefore, it is favorable for balancing the curvatures of the object-side surface and the image-side surface of the fourth lens element so as to prevent any single lens surface from having an overly large curvature, thereby reducing aberrations. The image-side surface of the fourth lens element can be convex in a paraxial region thereof. Therefore, it is favorable for controlling the back focal length of the imaging lens system so as to provide sufficient space for accommodating additional optical components. At least one of the object-side surface and the image-side surface of the fourth lens element can have at least one inflection point. Therefore, it is favorable for correcting distortion and astigmatism.

Figure 29:
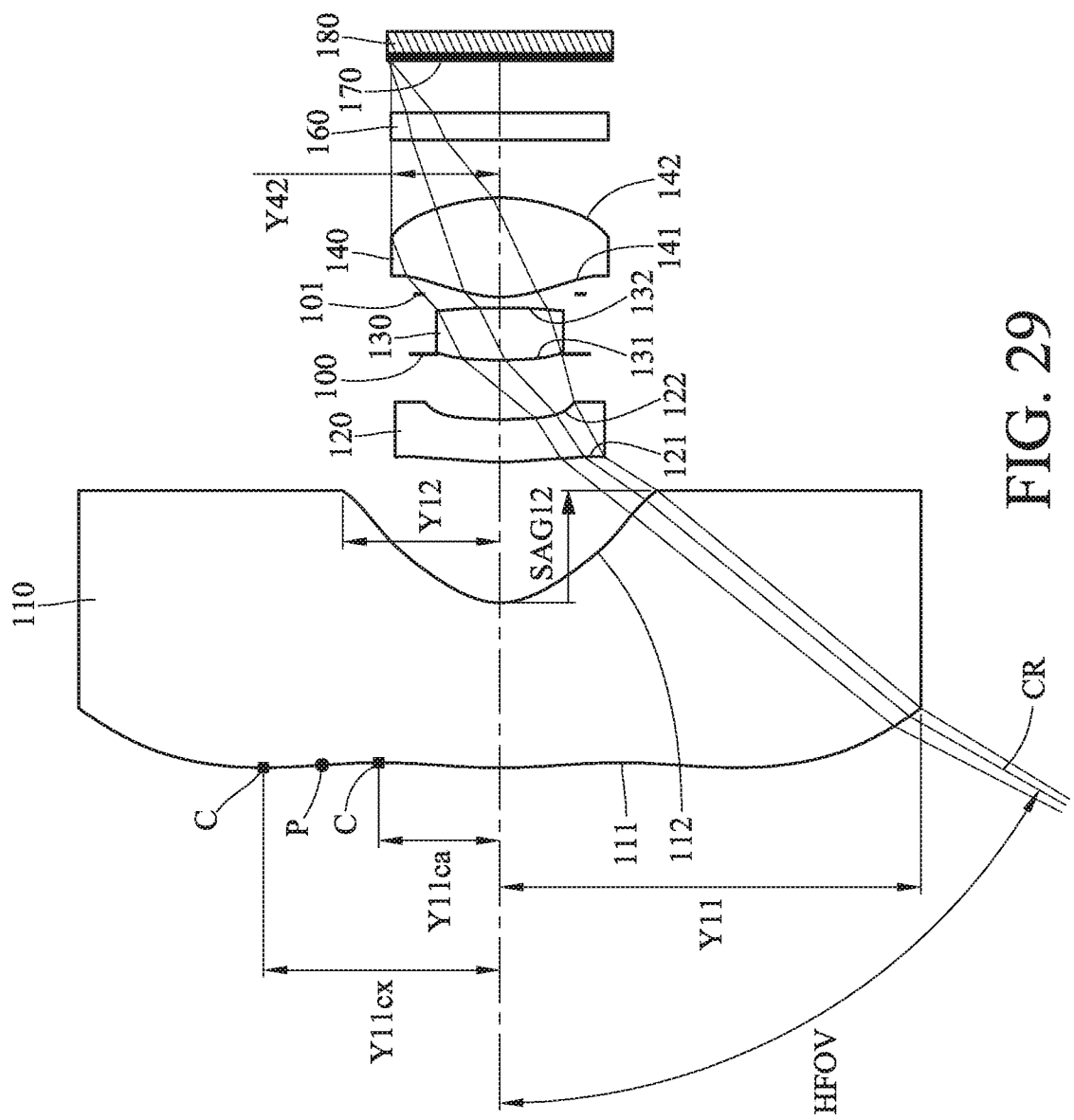
FIG. 29 shows a schematic view of CR, HFOV, Y11, Y11cx, Y11ca, Y12, Y42, SAG12 and an inflection point and critical points on the object-side surface of the first lens element according to the 1st embodiment of the present disclosure.

According to the present disclosure, at least one lens element of the imaging lens system can have at least one lens surface having at least one inflection point. Therefore, it is favorable for correcting field curvature and reducing the total track length of the imaging lens system so as to obtain a compact configuration. Please refer to FIG. 29, which shows a schematic view of an inflection point P on the object-side surface 111 of the first lens element 110 according to the 1st embodiment of the present disclosure. The inflection point P on the object-side surface of the first lens element in FIG. 29 is only exemplary. The other lens surfaces of the four lens elements may also have one or more inflection points.

When a central thickness of the first lens element is CT1, and a central thickness of the second lens element is CT2, the following condition is satisfied: $1.20<CT1/CT2<15.0$. Therefore, it is favorable for increasing the mechanical strength of the imaging lens system against harsh environmental conditions. Moreover, the following condition can also be satisfied: $1.50<CT1/CT2<5.0$. Moreover, the following condition can also be satisfied: $2.35<CT1/CT2<7.50$.

When a focal length of the first lens element is f1, and a focal length of the second lens element is f2, the following condition is satisfied: $|f1|<|f2|$. Therefore, it is favorable for the first lens element to control the light path, and for the second lens element to correct aberrations generated by the first lens element, such that the first lens element and the second lens element are configured as being complementary.

Figure 30:
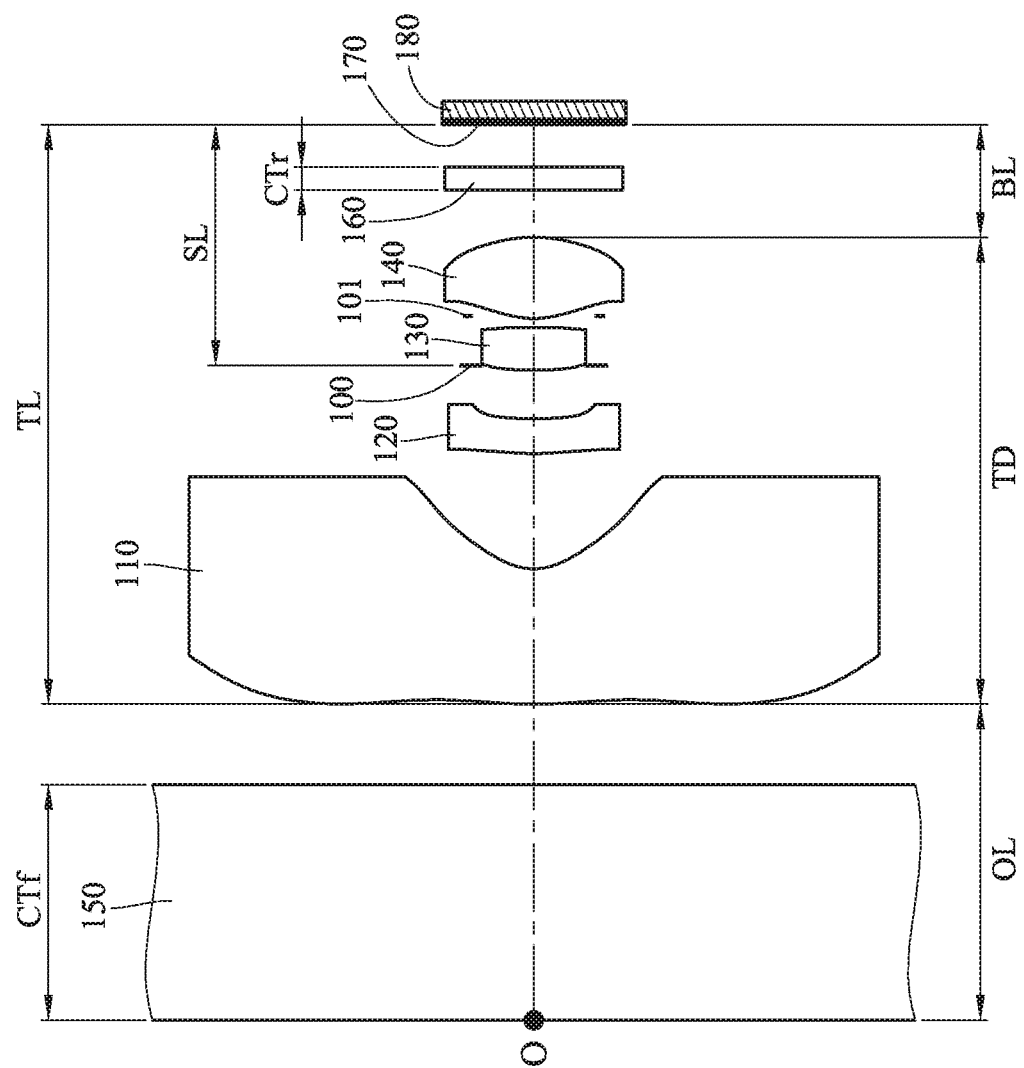
FIG. 30 shows a schematic view of CTf, OL, TL, TD, SL, BL and CTr according to the 1st embodiment of the present disclosure.

When an axial distance between the object-side surface of the first lens element and the image surface is TL, and a focal length of the imaging lens system is f, the following condition can be satisfied: $5.50<TL/f<16.0$. Therefore, it is favorable for balancing the total length and controlling the field of view of the imaging lens system so as to provide a retro-focus lens configuration, thereby making the imaging lens system applicable to various applications. Moreover, the following condition can also be satisfied: $5.50<TL/f<14.0$. Moreover, the following condition can also be satisfied: $8.50<TL/f<12.0$. Please refer to FIG. 30, which shows a schematic view of TL according to the 1st embodiment of the present disclosure.

When an axial distance between the imaged object and the object-side surface of the first lens element is OL, a central thickness of the first panel is CTf, an axial distance between the image-side surface of the fourth lens element and the image surface is BL, and a central thickness of the second panel is CTr, the following condition can be satisfied: $(OL-CTf)/(BL-CTr)<1.80$. Therefore, it is favorable for balancing space between the object side and the image side of the imaging lens system so as to achieve an efficient space arrangement of the imaging lens system. Please refer to FIG. 30, which shows a schematic view of CTf, OL, BL and CTr according to the 1st embodiment of the present disclosure, wherein the optical window 150 is the first panel, and the cover glass 160 is the second panel, but the present disclosure is not limited thereto. In other configurations, the second panel is, for example, a filter.

When the focal length of the imaging lens system is f, and an entrance pupil diameter of the imaging lens system is EPD, the following condition can be satisfied: $f/EPD<1.90$. Therefore, it is favorable for providing accurate identification under low-light conditions, such that the imaging lens system can be flexible in various environmental settings. Moreover, the following condition can also be satisfied: $0.50<f/EPD<1.70$. Moreover, the following condition can also be satisfied: $0.80<f/EPD<1.50$.

When the central thickness of the first panel is CTf, and an axial distance between the object-side surface of the first lens element and the image-side surface of the fourth lens element is TD, the following condition can be satisfied: $0.25<CTf/TD<1.50$. Therefore, it is favorable for providing the panel on the object side of the imaging lens system with sufficient structural strength to withstand a high amount of compressions by external forces, thereby providing better product utilization. Moreover, the following condition can also be satisfied: $0.35<CTf/TD<0.70$. Please refer to FIG. 30, which shows a schematic view of CTf and TD according to the 1st embodiment of the present disclosure.

When a curvature radius of the object-side surface of the fourth lens element is R7, and a curvature radius of the image-side surface of the fourth lens element is R8, the following condition can be satisfied: $-1.0<(R7+R8)/(R7-R8)$. Therefore, it is favorable for obtaining a proper curvature of the image-side surface of the fourth lens element so as to control an incident angle of light on the image surface with a proper back focal length. Moreover, the following condition can also be satisfied: $-1.0<(R7+R8)/(R7-R8)<5.0$. Moreover, the following condition can also be satisfied: $-0.50<(R7+R8)/(R7-R8)<0.50$.

When the focal length of the first lens element is f1, and a focal length of the third lens element is f3, the following condition can be satisfied: $|f1|<|f3|$. Therefore, it is favorable for having stronger refractive power on the object side of the imaging lens system so as to achieve compactness.

When the focal length of the first lens element is f1, and the focal length of the second lens element is f2, the following condition can be satisfied: $|f1/f2|<0.50$. Therefore, it is favorable for correcting aberrations of the first lens element by the second lens element as a correction lens so as to improve image quality. Moreover, the following condition can also be satisfied: $|f1/f2|<0.30$.

When a maximum value among Abbe numbers of all lens elements of the imaging lens system is Vmax, and a minimum value among Abbe numbers of all lens elements of the imaging lens system is Vmin, the following condition can be satisfied: $0 \leq Vmax-Vmin<10.0$. Therefore, it is favorable for obtaining highly similar materials for the lens elements so as to improve manufacturing planning and cost managements. Moreover, the following condition can also be satisfied: $0 \leq Vmax-Vmin<5.0$.

When a maximum effective radius of the image-side surface of the first lens element is Y12, and a curvature radius of the image-side surface of the first lens element is R2, the following condition can be satisfied: $1.50<Y12/R2<5.50$. Therefore, it is favorable for controlling the curvature distribution of the image-side surface of the first lens element so as to receive images and correct aberrations with a large angle of view. Please refer to FIG. 29, which shows a schematic view of Y12 according to the 1st embodiment of the present disclosure.

When the focal length of the second lens element is f2, and a focal length of the fourth lens element is f4, the following condition can be satisfied: $|f4/f2|<0.50$. Therefore, it is favorable for controlling the light path on the image side of the imaging lens system for various applications. Moreover, the following condition can also be satisfied: $|f4/f2|<0.30$.

According to the present disclosure, the imaging lens system further includes an aperture stop. When an axial distance between the aperture stop and the image surface is SL, and the axial distance between the object-side surface of the first lens element and the image surface is TL, the following condition can be satisfied: $0.25<SL/TL<0.60$. Therefore, it is favorable for controlling the position of the aperture stop while balancing between the field of view and the total track length of the imaging lens system. Moreover, the following condition can also be satisfied: $0.35<SL/TL<0.50$. Please refer to FIG. 30, which shows a schematic view of SL and TL according to the 1st embodiment of the present disclosure.

According to the present disclosure, an axial distance between the first panel and the first lens element can be smaller than 0.90 mm. Therefore, it is favorable for keeping the electronic device in a compact size so as to be applicable to a wide range of applications. Moreover, the axial distance between the first panel and the first lens element can be smaller than 0.55 mm.

When the focal length of the second lens element is f2, and the focal length of the fourth lens element is f4, the following condition can be satisfied: $|f4|<|f2|$. Therefore, it is favorable for balancing the refractive power distribution of the imaging lens system by the fourth lens element.

When the axial distance between the object-side surface of the first lens element and the image surface is TL, the following condition can be satisfied: $TL<4.50$ [mm]. Therefore, it is favorable for controlling the total length of the imaging lens system so as to achieve compactness. Moreover, the following condition can also be satisfied: $TL<4.0$ [mm].

When the focal length of the imaging lens system is f, the entrance pupil diameter of the imaging lens system is EPD, and an incident angle of a chief ray at a maximum field of view on the object-side surface of the first lens element relative to an optical axis (i.e., half of the maximum field of view of the imaging lens system) is HFOV, the following condition can be satisfied: $0<f/[EPD \times \tan(HFOV)]<1.0$. Therefore, it is favorable for enhancing the light-gathering ability and the imaging range of the imaging lens system. Moreover, the following condition can also be satisfied: $0.30<f/[EPD \times \tan(HFOV)]<0.90$. Please refer to FIG. 29, which shows a schematic view of HFOV according to the 1st embodiment of the present disclosure, wherein there is a chief ray CR at a maximum field of view of incidence on the object-side surface 111 of the first lens element 110, and the angle between the chief ray CR and the optical axis is HFOV.

When the axial distance between the object-side surface of the first lens element and the image surface is TL, and a maximum image height of the imaging lens system (half of a diagonal length of an effective photosensitive area of an image sensor) is ImgH, the following condition can be satisfied: $5.0<TL/ImgH<10.0$. Therefore, it is favorable for controlling the dimensions of the imaging lens system so as to properly balance the view angle and the image height. Moreover, the following condition can also be satisfied: $5.0<TL/ImgH<8.0$. Moreover, the following condition can also be satisfied: $5.0<TL/ImgH<7.0$.

According to the present disclosure, the imaging lens system can be operated within a wavelength range of 480 nanometers (nm) to 590 nm. Therefore, it is favorable for obtaining desirable identification results by being operated within a narrower wavelength range of visible light so as to be applicable to various applications. However, the imaging lens system of the present disclosure is not limited to be operated within the aforementioned wavelength range. In other aspects, the imaging lens system can be operated within other wavelength range of visible light or infrared light.

According to the present disclosure, each of the four lens elements of the imaging lens system can have an Abbe number larger than 50.0. Therefore, it is favorable for satisfying the requirements for identification applications while reducing manufacturing costs and increasing manufacturing feasibility.

When a vertical distance between a non-axial convex critical point on the object-side surface of the first lens element and the optical axis is Y11ex, and a vertical distance between a non-axial concave critical point on the object-side surface of the first lens element and the optical axis is Y11ca, the following condition can be satisfied: 1.10<Y11cx/Y11ca<3.20. Therefore, it is favorable for correcting aberrations at different fields of view and reducing the total track length of the imaging lens system. Moreover, the following condition can also be satisfied: 1.30<Y11cx/Y11ca<2.20. Please refer to FIG. 29, which shows a schematic view of Y11cx, Y11ca and critical points C on the object-side surface 111 of the first lens element 110 according to the 1st embodiment of the present disclosure. The critical points C on the object-side surface of the first lens element in FIG. 29 is only exemplary. The other lens surfaces of the four lens elements may also have one or more critical points.

When the focal length of the imaging lens system is f, the focal length of the first lens element is f1, the focal length of the second lens element is f2, and the focal length of the third lens element is f3, the following condition can be satisfied: 0<|f/f1|−|f/f2|−|f/f3|. Therefore, it is favorable for providing the first lens element with sufficient power, and correcting aberrations by the second lens element and third lens elements so as to improve image quality.

When the maximum image height of the imaging lens system is ImgH, and the focal length of the imaging lens system is f, the following condition can be satisfied: 1.20<ImgH/f<3.0. Therefore, it is favorable for providing a retro-focus lens configuration so as to achieve a wider imaging range and capture more image information, thereby improving image identifications.

According to the present disclosure, an axial distance between the first lens element and the second lens element T12 can be a maximum among axial distances between each of all adjacent lens elements of the imaging lens system. That is, the axial distance between the first lens element and the second lens element T12 can be larger than or equal to an axial distance between the second lens element and the third lens element T23, and an axial distance between the third lens element and the fourth lens element T34. Therefore, it is favorable for providing sufficient space on the object side of the imaging lens system so as to retrieve light with a large field of view, thereby reducing aberrations.

According to the present disclosure, the central thickness of the first lens element CT1 can be a maximum among central thickness of all lens elements of the imaging lens system. That is, the central thickness of the first lens element CT1 can be larger than or equal to the central thickness of the second lens element CT2, a central thickness of the third lens element CT3, and a central thickness of the fourth lens element CT4. Therefore, it is favorable for balancing among the thicknesses of the lens elements with different dimensions so as to improve the lens molding quality and the assembling yield rate.

When the focal length of the third lens element is f3, and the focal length of the fourth lens element is f4, the following condition can be satisfied: |f4|<|f3|. Therefore, it is favorable for balancing the refractive power distribution on the image side of the imaging lens system so as to provide good image quality.

When a displacement in parallel with the optical axis from an axial vertex to a maximum effective radius position on the image-side surface of the first lens element is SAG12, and the curvature radius of the image-side surface of the first lens element is R2, the following condition can be satisfied: 1.20<SAG12/R2<5.50. Therefore, it is favorable for retrieving light at a large field of view so as to achieve a large imaging area and effectively reduce the total length of the imaging lens system. Please refer to FIG. 29, which shows a schematic view of SAG12 according to the 1st embodiment of the present disclosure. When the direction from the axial vertex of one surface to the maximum effective radius position of the same surface is facing towards the image side of the imaging lens system, the value of displacement is positive; when the direction from the axial vertex of the surface to the maximum effective radius position of the same surface is facing towards the object side of the imaging lens system, the value of displacement is negative.

When a maximum effective radius of the object-side surface of the first lens element is Y11, and a maximum effective radius of the image-side surface of the fourth lens element is Y42, the following condition can be satisfied: 3.0<Y11/Y42<6.0. Therefore, it is favorable for balancing the aperture diameters on the object side and image side of the imaging lens system so as to obtain a large field of view and a proper light receiving area. Moreover, the following condition can also be satisfied: 3.30<Y11/Y42<4.30. Please refer to FIG. 29, which shows a schematic view of Y11 and Y42 according to the 1st embodiment of the present disclosure.

When a maximum value among all axial distances between each of all adjacent lens elements of the imaging lens system is ATmax, and a minimum value among central thicknesses of all lens elements of the imaging lens system is CTmin, the following condition can be satisfied: 3.0<ATmax/CTmin<5.0. Therefore, it is favorable for balancing between the total length of the imaging lens system and the thicknesses of the lens elements so as to improve space utilization.

According to the present disclosure, the aforementioned features and conditions can be utilized in numerous combinations so as to achieve corresponding effects.

According to the present disclosure, the lens elements of the imaging lens system can be made of either glass or plastic material. When the lens elements are made of glass material, the refractive power distribution of the imaging lens system may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the imaging lens system can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters (e.g., refractive index and focal length) of the imaging lens system, the identification module and the electronic device are not specifically defined, these parameters may be determined according to the operating wavelength range.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the present disclosure, the imaging lens system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
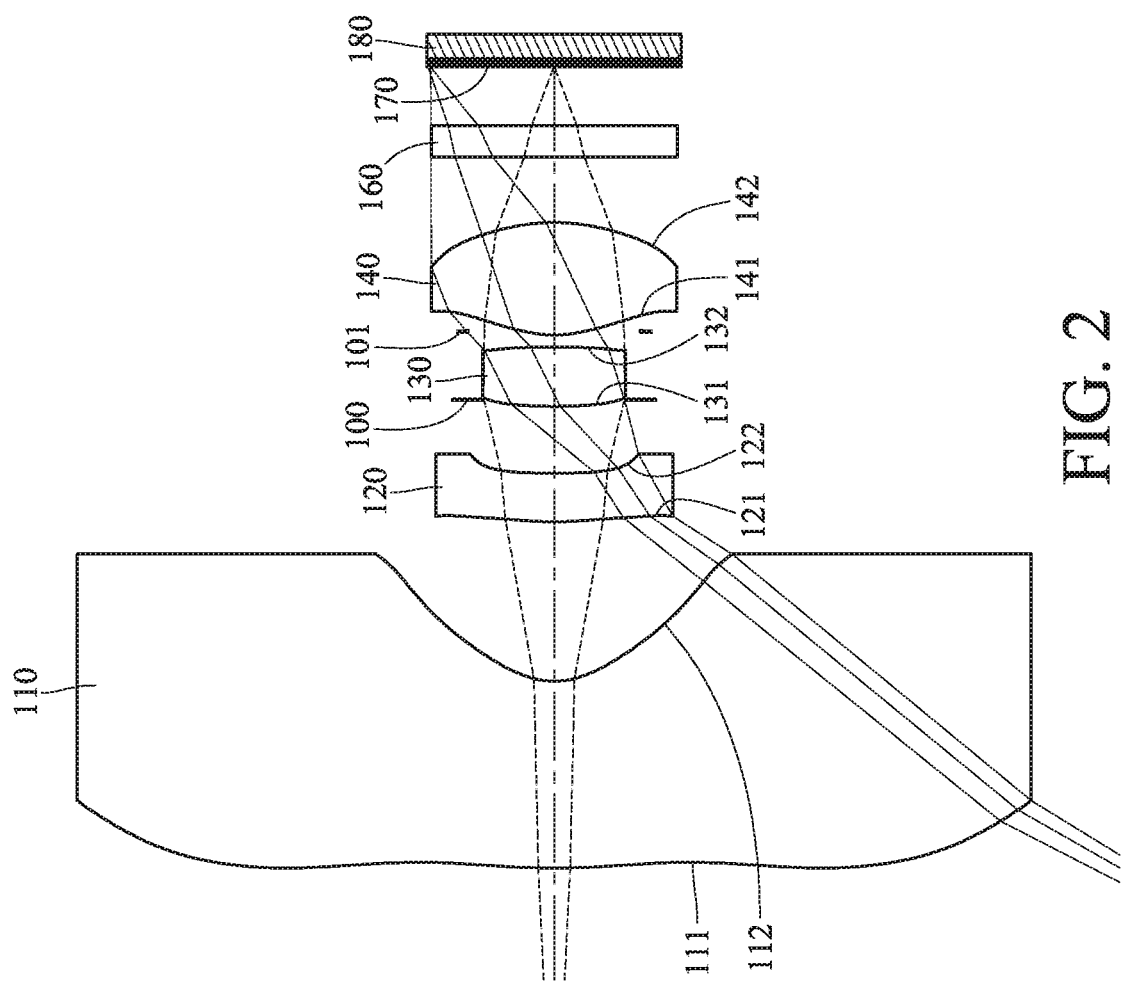
FIG. 2 is a partially enlarged view of FIG. 1.
Figure 3:
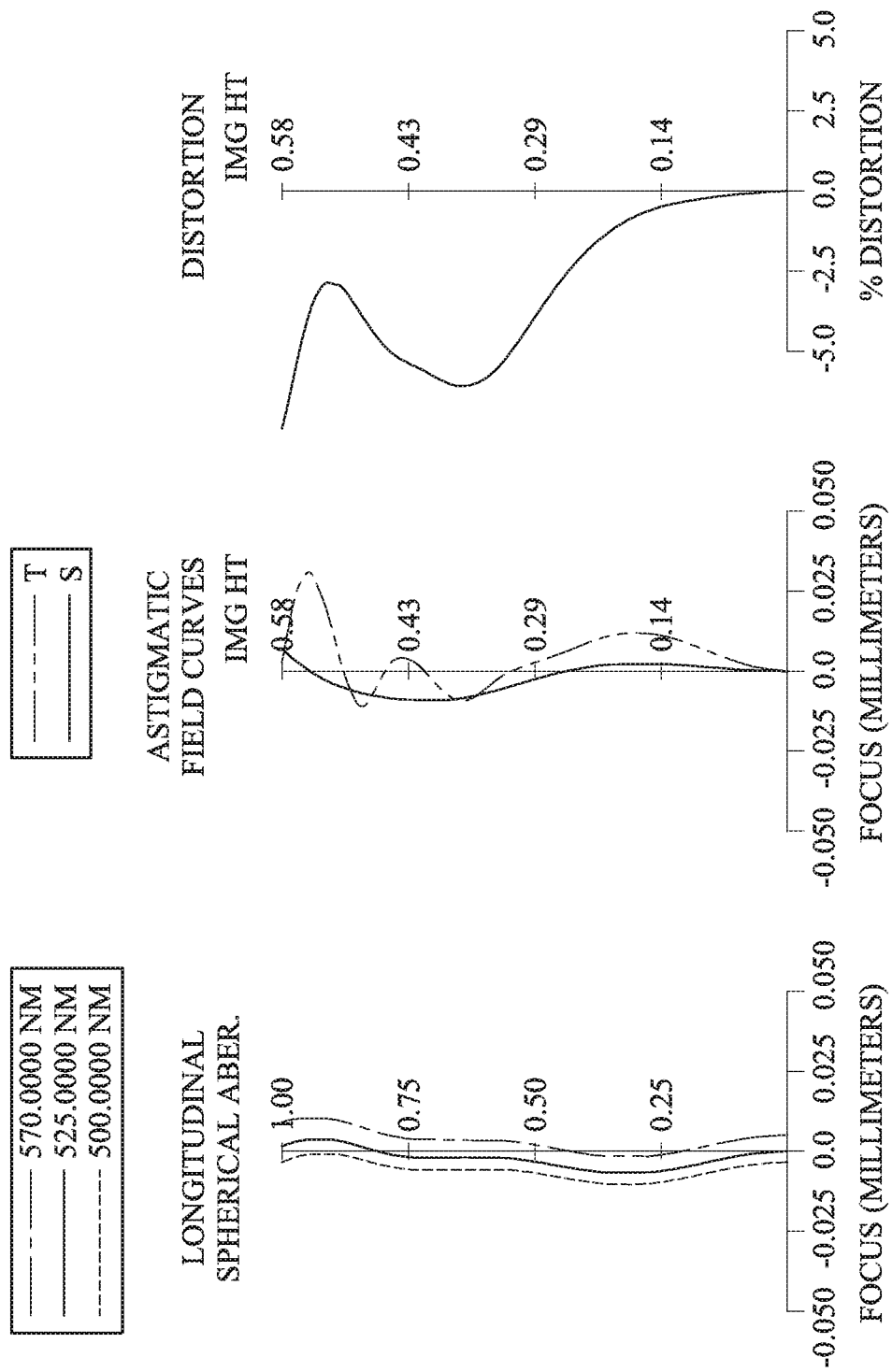
FIG. 3 shows spherical aberration curves, astigmatic field curves and a distortion curve of the image capturing unit according to the 1st embodiment.

FIG. 1 is a schematic view of an identification module according to the 1st embodiment of the present disclosure. FIG. 2 is a partially enlarged view of FIG. 1. FIG. 3 shows, in order from left to right, spherical aberration curves, astigmatic field curves and a distortion curve of the image capturing unit according to the 1st embodiment. In FIG. 1 and FIG. 2, the identification module includes the imaging lens system (its reference numeral is omitted) of the present disclosure, an optical window 150, a cover glass 160 and an image sensor 180. The imaging lens system includes, in order from an object side to an image side, a first lens element 110, a second lens element 120, an aperture stop 100, a third lens element 130, a stop 101, a fourth lens element 140 and an image surface 170. The imaging lens system includes four lens elements (110, 120, 130 and 140) with no additional lens element disposed between each of the adjacent four lens elements.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has two inflection points. The image-side surface 112 of the first lens element 110 has two inflection points. The object-side surface 111 of the first lens element 110 has at least one convex critical point and at least one concave critical point in an off-axis region thereof.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has three inflection points.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has two inflection points.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has one inflection point.

The optical window 150 is a light-permeable substrate and located between the imaged object O and the first lens element 110 (i.e., the object side of the first lens element 110), and will not affect the focal length of the imaging lens system. The cover glass 160 is a glass panel and located between the fourth lens element 140 and the image surface 170 (i.e., the image side of the fourth lens element 140), and will not affect the focal length of the imaging lens system. The image sensor 180 is disposed on or near the image surface 170 of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens system of the image capturing unit according to the 1st embodiment, when a focal length of the imaging lens system is f, an f-number of the imaging lens system in a working distance (in this embodiment, the working distance includes a central thickness of the optical window 150) is Fno(work), an f-number of the imaging lens system for imaged object at an infinite distance is Fno(inf.), and an incident angle of a chief ray at a maximum field of view on the object-side surface 111 of the first lens element 110 relative to the optical axis is HFOV, these parameters have the following values: f=0.36 millimeters (mm), Fno(work)=1.41, Fno(inf.)=1.37, HFOV=60.4 degrees (deg.).

When a central thickness of the first lens element 110 is CT1, and a central thickness of the second lens element 120 is CT2, the following condition is satisfied: CT1/CT2=3.87.

When a maximum value among all axial distances between each of all adjacent lens elements of the imaging lens system is ATmax, and a minimum value among central thicknesses of all lens elements of the imaging lens system is CTmin, the following condition is satisfied: ATmax/CTmin=3.30. In this embodiment, an axial distance between two adjacent lens elements is an air gap in a paraxial region between the two adjacent lens elements. ATmax is equal to an axial distance between the first lens element 110 and the second lens element 120, and CTmin is equal to the central thickness of the second lens element 120.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=−0.23.

When a focal length of the first lens element 110 is f1, and a focal length of the second lens element 120 is f2, the following condition is satisfied: |f1/f2|=0.14.

When the focal length of the second lens element 120 is f2, and a focal length of the fourth lens element 140 is f4, the following condition is satisfied: |f4/f2|=0.11.

When the focal length of the imaging lens system is f, the focal length of the first lens element 110 is f1, the focal length of the second lens element 120 is f2, and a focal length of the third lens element 130 is f3, the following condition is satisfied: |f/f1|−|f/f2|−|f/f3|=0.33.

When the focal length of the imaging lens system is f, and an entrance pupil diameter of the imaging lens system is EPD, the following condition is satisfied: f/EPD=1.37.

When the central thickness of the optical window 150 is CTf, and an axial distance between the object-side surface 111 of the first lens element 110 and the image-side surface 142 of the fourth lens element 140 is TD, the following condition is satisfied: CTf/TD=0.50.

When an axial distance between the imaged object O and the object-side surface 111 of the first lens element 110 is OL, the central thickness of the optical window 150 is CTf, an axial distance between the image-side surface 142 of the fourth lens element 140 and the image surface 170 is BL, and a central thickness of the cover glass 160 is CTr, the following condition is satisfied: (OL−CTf)/(BL−CTr)=0.90.

When an axial distance between the aperture stop 100 and the image surface 170 is SL, and an axial distance between the object-side surface 111 of the first lens element 110 and the image surface 170 is TL, the following condition is satisfied: SL/TL=0.42.

When the axial distance between the object-side surface 111 of the first lens element 110 and the image surface 170 is TL, and the focal length of the imaging lens system is f, the following condition is satisfied: TL/f=10.17.

When a maximum image height of the imaging lens system is ImgH, and the focal length of the imaging lens system is f, the following condition is satisfied: ImgH/f=1.60.

When the axial distance between the object-side surface 111 of the first lens element 110 and the image surface 170 is TL, the following condition is satisfied: TL=3.69 [mm].

When the axial distance between the object-side surface 111 of the first lens element 110 and the image surface 170 is TL, and the maximum image height of the imaging lens system is ImgH, the following condition is satisfied: TL/ImgH=6.36.

When a maximum effective radius of the image-side surface 112 of the first lens element 110 is Y12, and a curvature radius of the image-side surface 112 of the first lens element 110 is R2, the following condition is satisfied: Y12/R2=2.26.

When a displacement in parallel with the optical axis from an axial vertex to a maximum effective radius position on the image-side surface 112 of the first lens element 110 is SAG12, and the curvature radius of the image-side surface 112 of the first lens element 110 is R2, the following condition is satisfied: SAG12/R2=1.62.

When a maximum value among Abbe numbers of all lens elements of the imaging lens system is Vmax, and a minimum value among Abbe numbers of all lens elements of the imaging lens system is Vmin, the following condition is satisfied: Vmax−Vmin=0. In this embodiment, the Abbe numbers of the first through fourth lens elements (110, 120, 130 and 140) are the same, so Vmax=Vmin.

When the focal length of the imaging lens system is f, the entrance pupil diameter of the imaging lens system is EPD, and the incident angle of the chief ray at the maximum field of view on the object-side surface 111 of the first lens element 110 relative to the optical axis is HFOV, the following condition is satisfied: f/[EPD×tan(HFOV)]=0.78.

When a vertical distance between the non-axial convex critical point on the object-side surface 111 of the first lens element 110 and the optical axis is Y11cx, and a vertical distance between the non-axial concave critical point on the object-side surface 111 of the first lens element 110 and the optical axis is Y11ca, the following condition is satisfied: Y11cx/Y11ca=1.95.

When a maximum effective radius of the object-side surface 111 of the first lens element 110 is Y11, and a maximum effective radius of the image-side surface 142 of the fourth lens element 140 is Y42, the following condition is satisfied: Y11/Y42=3.88.

The detailed optical data of the 1st embodiment are shown in Table 1 and the aspheric surface data are shown in Table 2 below.

tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 4:
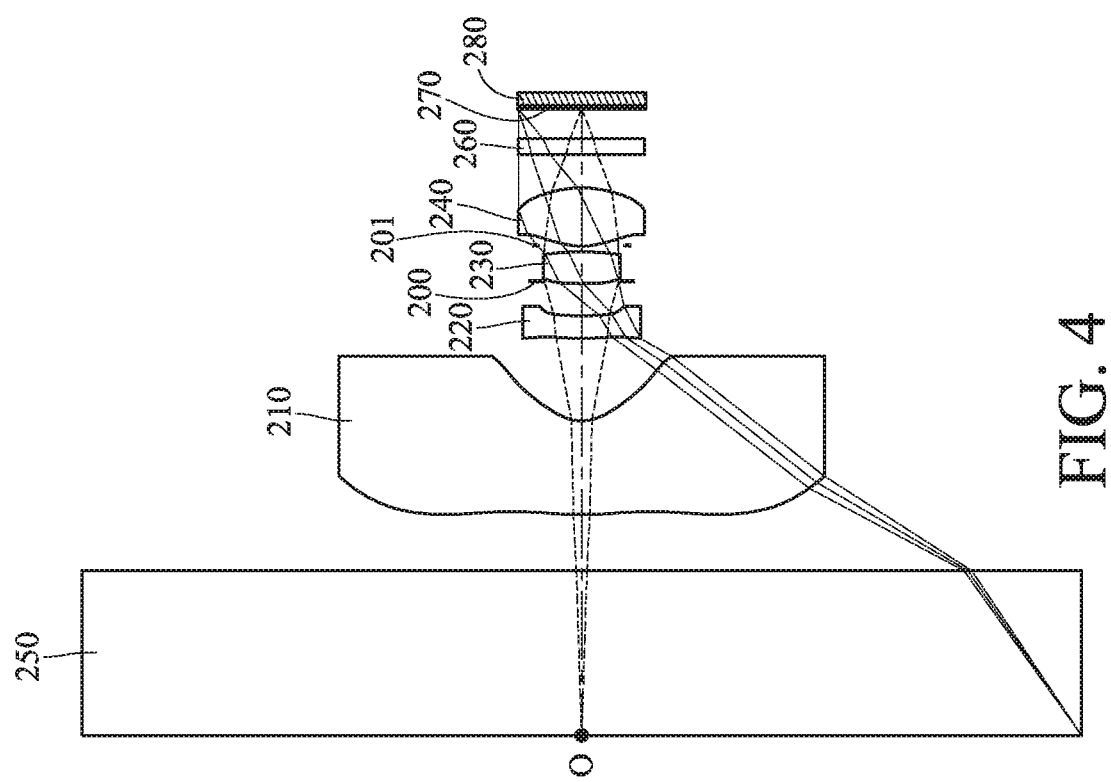
FIG. 4 is a schematic view of an identification module according to the 2nd embodiment of the present disclosure.
Figure 5:
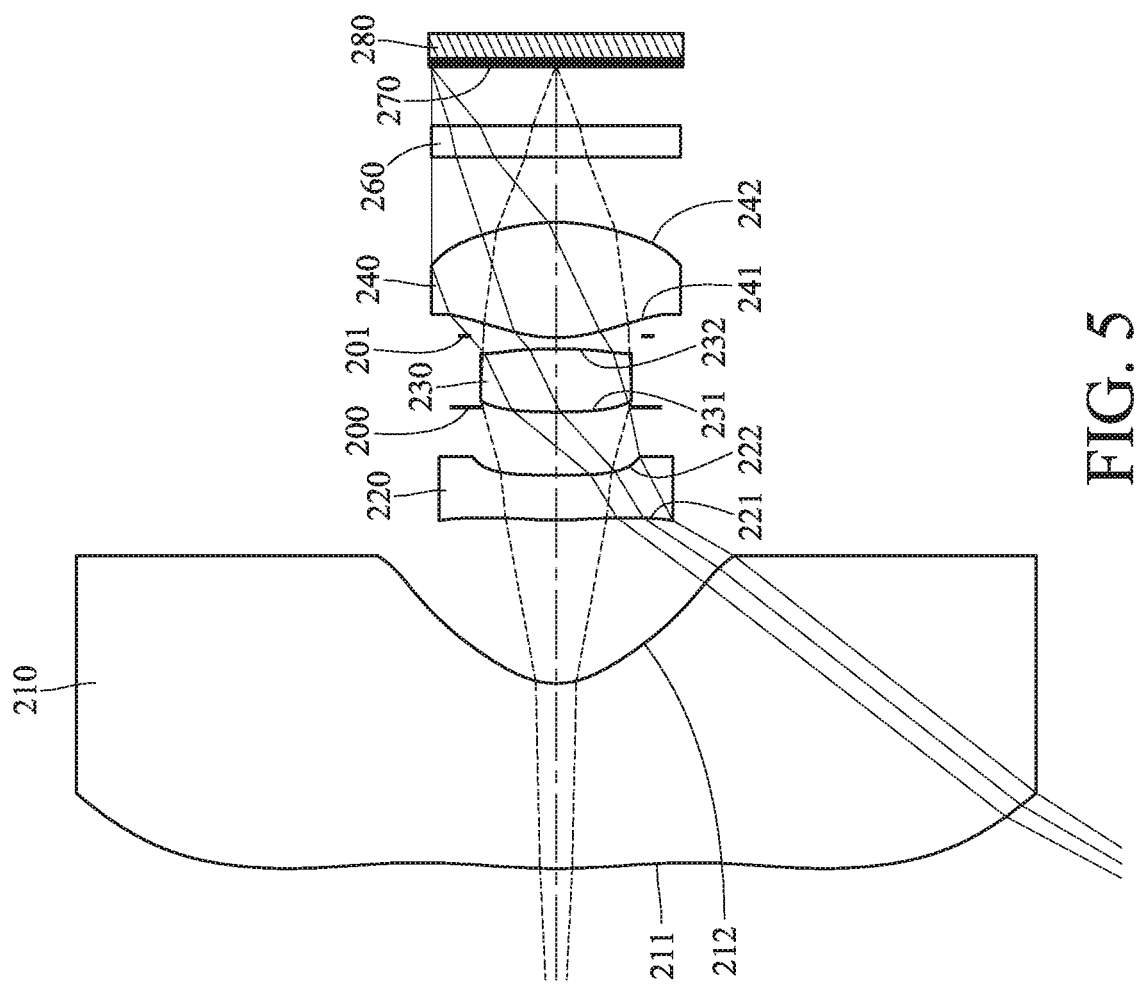
FIG. 5 is a partially enlarged view of FIG. 4.
Figure 6:
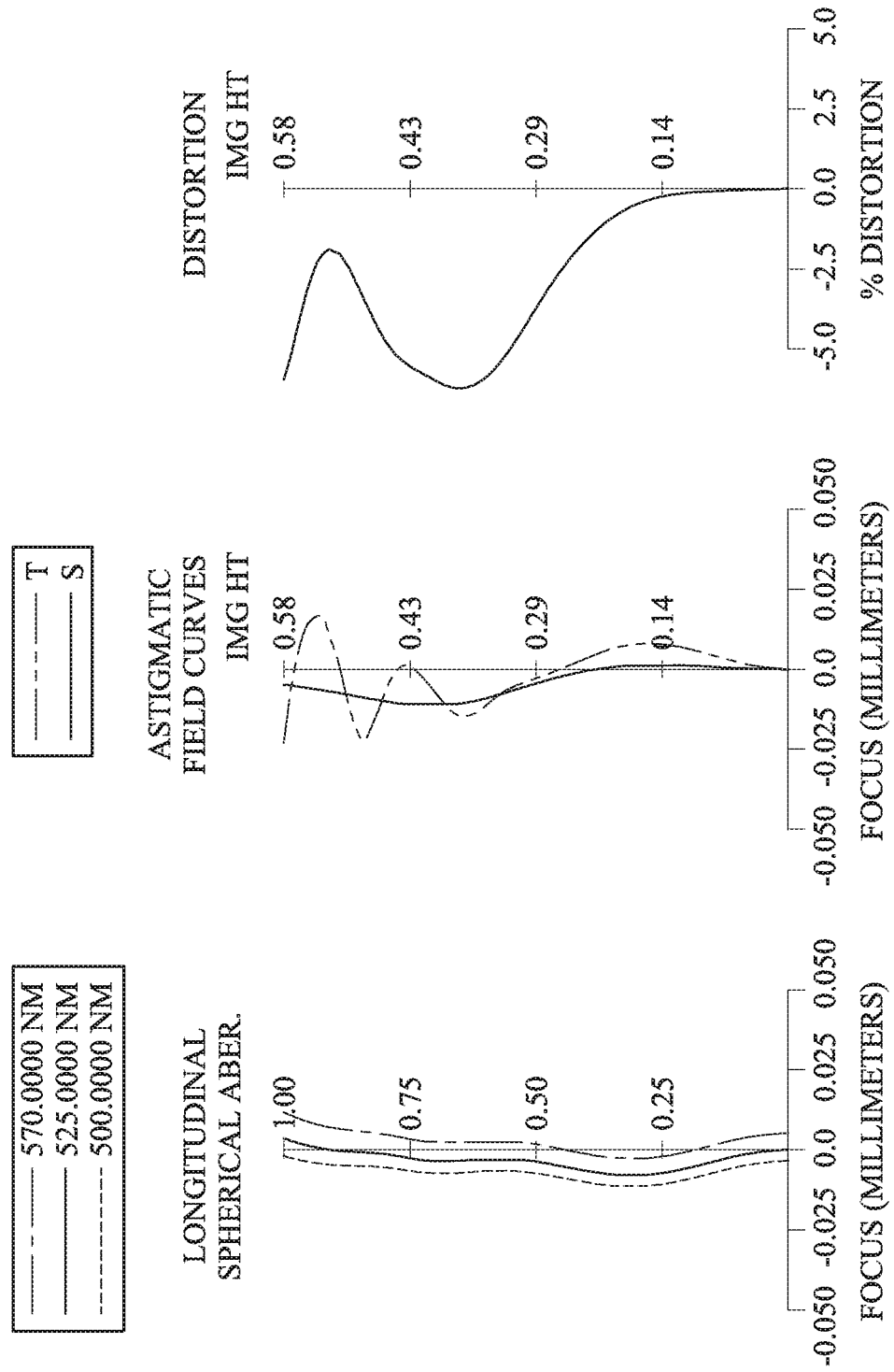
FIG. 6 shows spherical aberration curves, astigmatic field curves and a distortion curve of the image capturing unit according to the 2nd embodiment.

FIG. 4 is a schematic view of an identification module according to the 2nd embodiment of the present disclosure. FIG. 5 is a partially enlarged view of FIG. 4. FIG. 6 shows,

TABLE 1

1st Embodiment
f = 0.36 mm, Fno(work) = 1.41, Fno(inf.) = 1.37, HFOV = 60.4 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.512 | | | | |
| 3 | Lens 1 | 2.975 | (ASP) | 0.861 | Plastic | 1.548 | 56.0 | −0.85 |
| 4 | | 0.362 | (ASP) | 0.734 | | | | |
| 5 | Lens 2 | 1.410 | (ASP) | 0.222 | Plastic | 1.548 | 56.0 | 6.04 |
| 6 | | 2.321 | (ASP) | 0.339 | | | | |
| 7 | Ape. Stop | Plano | | −0.029 | | | | |
| 8 | Lens 3 | 2.796 | (ASP) | 0.270 | Plastic | 1.548 | 56.0 | 10.36 |
| 9 | | 5.324 | (ASP) | 0.073 | | | | |
| 10 | Stop | Plano | | −0.015 | | | | |
| 11 | Lens 4 | 0.520 | (ASP) | 0.517 | Plastic | 1.548 | 56.0 | 0.67 |
| 12 | | −0.827 | (ASP) | 0.300 | | | | |
| 13 | Cover Glass | Plano | | 0.145 | Glass | 1.520 | 64.2 | — |
| 14 | | Plano | | 0.271 | | | | |
| 15 | Image | Plano | | — | | | | |

Note:
Reference wavelength is 525 nm.
The working distance is the axial distance (2.012 mm) between the imaged object O (Surface 0) and the object-side surface 111 (Surface 3).
An effective radius of the stop 101 (Surface 10) is 0.400 mm.

TABLE 2

Aspheric Coefficients

| Surface # | 3 | 4 | 5 | 6 |
|---|---|---|---|---|
| k = | −7.5615E−02 | −9.9014E−01 | −8.0158E+00 | 7.6369E+00 |
| A4 = | −3.5499E−01 | −2.2609E+00 | −2.7080E+00 | −1.5749E+00 |
| A6 = | 2.8955E−01 | 4.5614E+00 | 1.4535E+01 | 3.4354E+01 |
| A8 = | −1.2466E−01 | −1.7090E+01 | −4.6580E+00 | −4.7998E+01 |
| A10 = | 3.0717E−02 | 8.5975E+01 | −2.3345E+02 | −1.3153E+03 |
| A12 = | −4.1130E−03 | −1.9869E+02 | 7.8209E+02 | 1.4188E+04 |
| A14 = | 2.5076E−04 | 1.9695E+02 | −8.0514E+02 | −3.6655E+04 |
| A16 = | −3.5065E−06 | −6.9868E+01 | — | — |

| Surface # | 8 | 9 | 11 | 12 |
|---|---|---|---|---|
| k = | 4.7699E+01 | 7.5880E+00 | −3.1065E−01 | −3.5020E−01 |
| A4 = | 4.4002E−01 | −8.9169E+00 | −7.7521E+00 | 1.7289E+00 |
| A6 = | 1.3943E+01 | 2.0323E+02 | 9.2786E+01 | −1.8428E+01 |
| A8 = | −1.2654E+02 | −3.7936E+03 | −9.7450E+02 | 1.8622E+02 |
| A10 = | 1.1422E+03 | 4.9201E+04 | 6.5932E+03 | −1.1973E+03 |
| A12 = | −4.8404E+03 | −3.8255E+05 | −2.7399E+04 | 4.2000E+03 |
| A14 = | 6.4928E+03 | 1.6023E+06 | 6.2224E+04 | −7.7161E+03 |
| A16 = | — | −2.7040E+06 | −5.8669E+04 | 5.8027E+03 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The in order from left to right, spherical aberration curves, astigmatic field curves and a distortion curve of the image capturing unit according to the 2nd embodiment. In FIG. 4 and FIG. 5, the identification module includes the imaging lens system (its reference numeral is omitted) of the present disclosure, an optical window 250, a cover glass 260 and an image sensor 280. The imaging lens system includes, in order from an object side to an image side, a first lens element 210, a second lens element 220, an aperture stop 200, a third lens element 230, a stop 201, a fourth lens element 240 and an image surface 270. The imaging lens system includes four lens elements (210, 220, 230 and 240) with no additional lens element disposed between each of the adjacent four lens elements.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has two inflection points. The image-side surface 212 of the first lens element 210 has two inflection points. The object-side surface 211 of the first lens element 210 has at least one convex critical point and at least one concave critical point in an off-axis region thereof.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The image-side surface 232 of the third lens element 230 has one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has one inflection point.

The optical window 250 is a light-permeable substrate and located between the imaged object O and the first lens element 210 (i.e., the object side of the first lens element 210), and will not affect the focal length of the imaging lens system. The cover glass 260 is a glass panel and located between the fourth lens element 240 and the image surface 270 (i.e., the image side of the fourth lens element 240), and will not affect the focal length of the imaging lens system. The image sensor 280 is disposed on or near the image surface 270 of the imaging lens system.

The detailed optical data of the 2nd embodiment are shown in Table 3 and the aspheric surface data are shown in Table 4 below.

TABLE 3

2nd Embodiment
f = 0.35 mm, Fno(work) = 1.38, Fno(inf.) = 1.34, HFOV = 59.7 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.511 | | | | |
| 3 | Lens 1 | 2.964 | (ASP) | 0.851 | Plastic | 1.548 | 56.0 | −0.83 |
| 4 | | 0.353 | (ASP) | 0.752 | | | | |
| 5 | Lens 2 | 1.593 | (ASP) | 0.205 | Plastic | 1.548 | 56.0 | 8.85 |
| 6 | | 2.264 | (ASP) | 0.313 | | | | |
| 7 | Ape. Stop | Plano | | −0.021 | | | | |
| 8 | Lens 3 | 2.850 | (ASP) | 0.289 | Plastic | 1.548 | 56.0 | 4.47 |
| 9 | | −16.895 | (ASP) | 0.059 | | | | |
| 10 | Stop | Plano | | −0.006 | | | | |
| 11 | Lens 4 | 0.567 | (ASP) | 0.531 | Plastic | 1.548 | 56.0 | 0.72 |
| 12 | | −0.861 | (ASP) | 0.300 | | | | |
| 13 | Cover Glass | Plano | | 0.145 | Glass | 1.520 | 64.2 | — |
| 14 | | Plano | | 0.271 | | | | |
| 15 | Image | Plano | | — | | | | |

Note:
Reference wavelength is 525 nm.
The working distance is the axial distance (2.011 mm) between the imaged object O (Surface 0) and the object-side surface 211 (Surface 3).
An effective radius of the stop 201 (Surface 10) is 0.400 mm.

TABLE 4

Aspheric Coefficients

| Surface # | 3 | 4 | 5 | 6 |
|---|---|---|---|---|
| k = | −2.4632E−01 | −1.0000E+00 | −1.5610E+01 | 0.0000E+00 |
| A4 = | −3.5476E−01 | −2.2911E+00 | −2.9412E+00 | −1.7385E+00 |
| A6 = | 2.8937E−01 | 4.5667E+00 | 1.4187E+01 | 3.3417E+01 |
| A8 = | −1.2460E−01 | −1.7053E+01 | −2.6595E+00 | −2.1047E+01 |
| A10 = | 3.0732E−02 | 8.5964E+01 | −2.3326E+02 | −1.3828E+03 |
| A12 = | −4.1114E−03 | −1.9870E+02 | 7.8209E+02 | 1.4188E+04 |

TABLE 4-continued

| Aspheric Coefficients | | | | |
|---|---|---|---|---|
| A14 = | 2.5072E−04 | 1.9695E+02 | −8.0514E+02 | −3.6655E+04 |
| A16 = | −3.5636E−06 | −6.9868E+01 | — | — |
| Surface # | 8 | 9 | 11 | 12 |
| k = | 0.0000E+00 | 0.0000E+00 | −3.1172E−01 | 3.0098E−01 |
| A4 = | 8.7863E−01 | −8.1284E+00 | −7.0331E+00 | 1.8012E+00 |
| A6 = | 1.5183E+01 | 1.9943E+02 | 9.0184E+01 | −1.7831E+01 |
| A8 = | −1.3192E+02 | −3.7871E+03 | −9.6440E+02 | 1.8493E+02 |
| A10 = | 1.2198E+03 | 4.9236E+04 | 6.5849E+03 | −1.1931E+03 |
| A12 = | −4.8404E+03 | −3.8255E+05 | −2.7399E+04 | 4.2005E+03 |
| A14 = | 6.4928E+03 | 1.6023E+06 | 6.2224E+04 | −7.7161E+03 |
| A16 = | — | −2.7040E+06 | −5.8669E+04 | 5.8027E+03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 0.35 | (OL − CTf)/(BL − CTr) | 0.89 |
| Fno(work) | 1.38 | SL/TL | 0.43 |
| Fno(inf.) | 1.34 | TL/f | 10.41 |
| HFOV [deg.] | 59.7 | ImgH/f | 1.64 |
| CT1/CT2 | 4.15 | TL [mm] | 3.69 |
| ATmax/CTmin | 3.67 | TL/ImgH | 6.36 |
| (R7 + R8)/(R7 − R8) | −0.21 | Y12/R2 | 2.31 |
| |f1/f2| | 0.09 | SAG12/R2 | 1.66 |
| |f4/f2| | 0.08 | Vmax − Vmin | 0 |
| |f/f1| − |f/f2| − |f/f3| | 0.31 | f/[EPD × tan(HFOV)] | 0.78 |
| f/EPD | 1.34 | Y11cx/Y11ca | 1.97 |
| CTf/TD | 0.50 | Y11/Y42 | 3.85 |

3rd Embodiment

Figure 7:
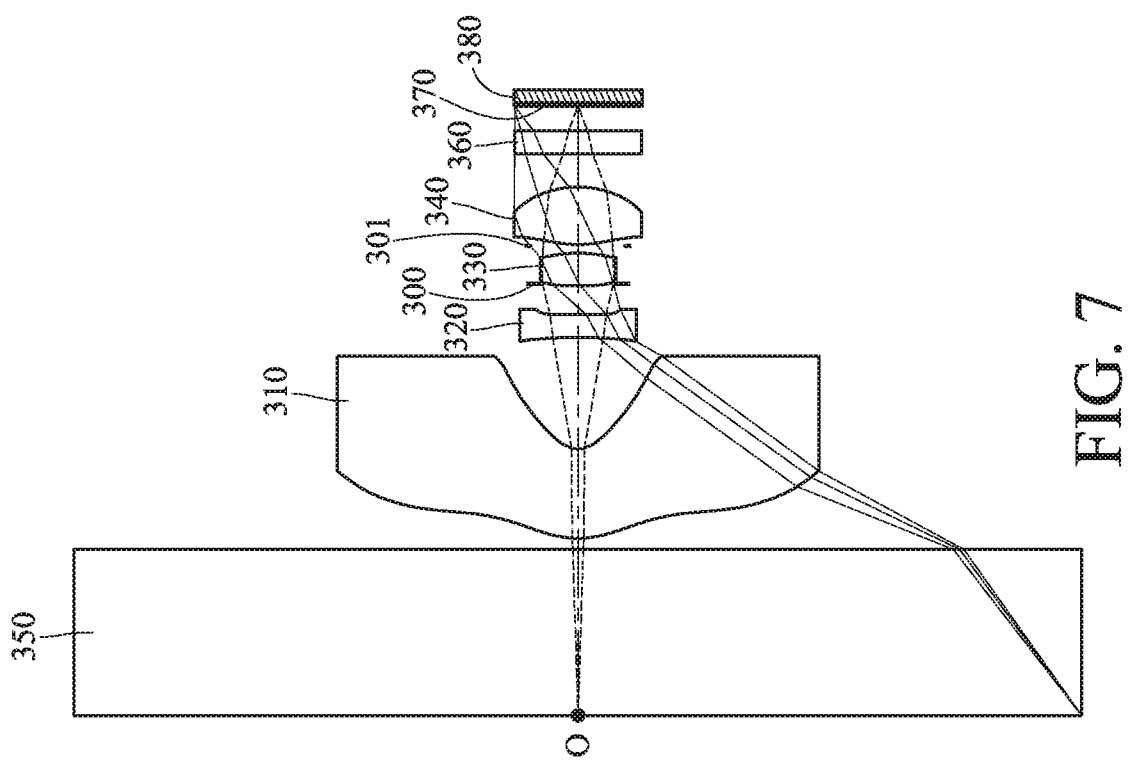
FIG. 7 is a schematic view of an identification module according to the 3rd embodiment of the present disclosure.
Figure 8:
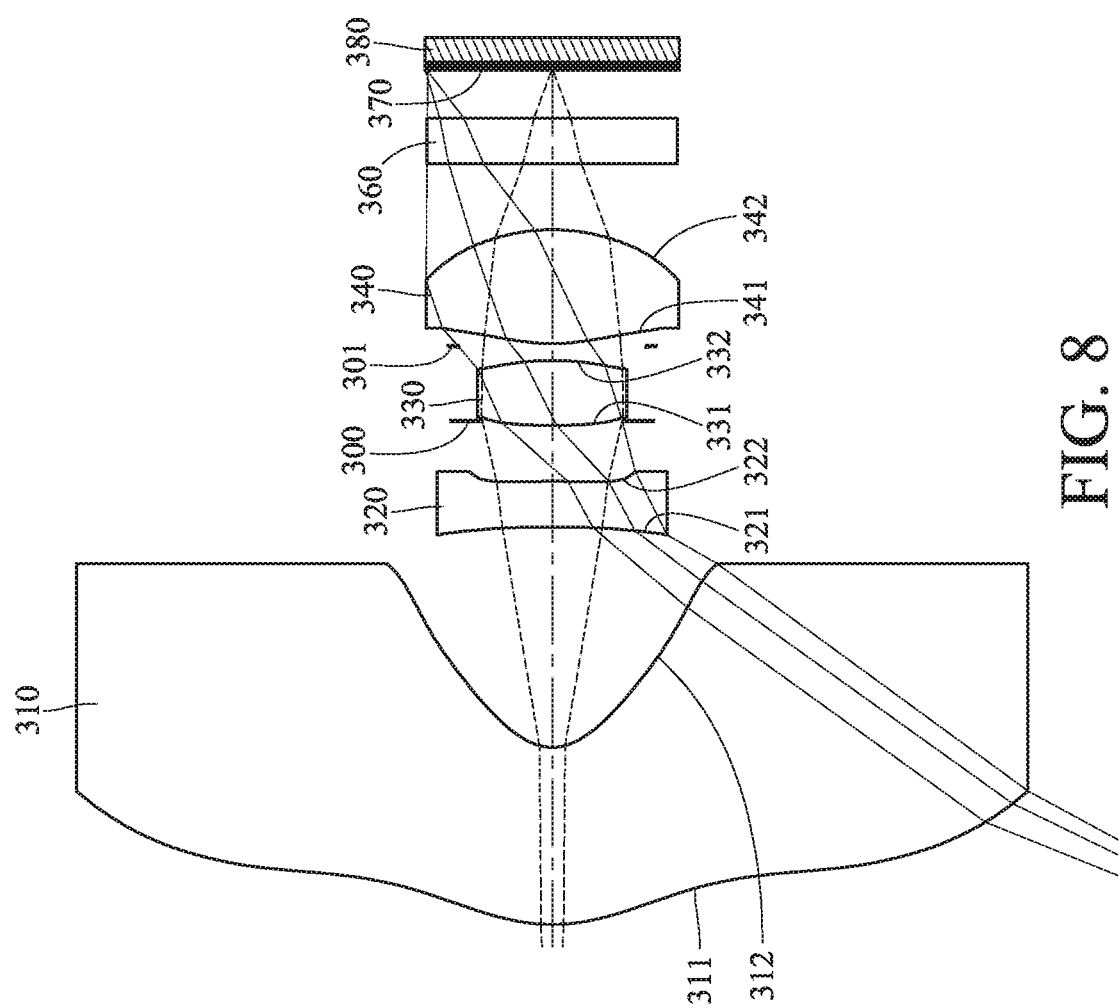
FIG. 8 is a partially enlarged view of FIG. 7.
Figure 9:
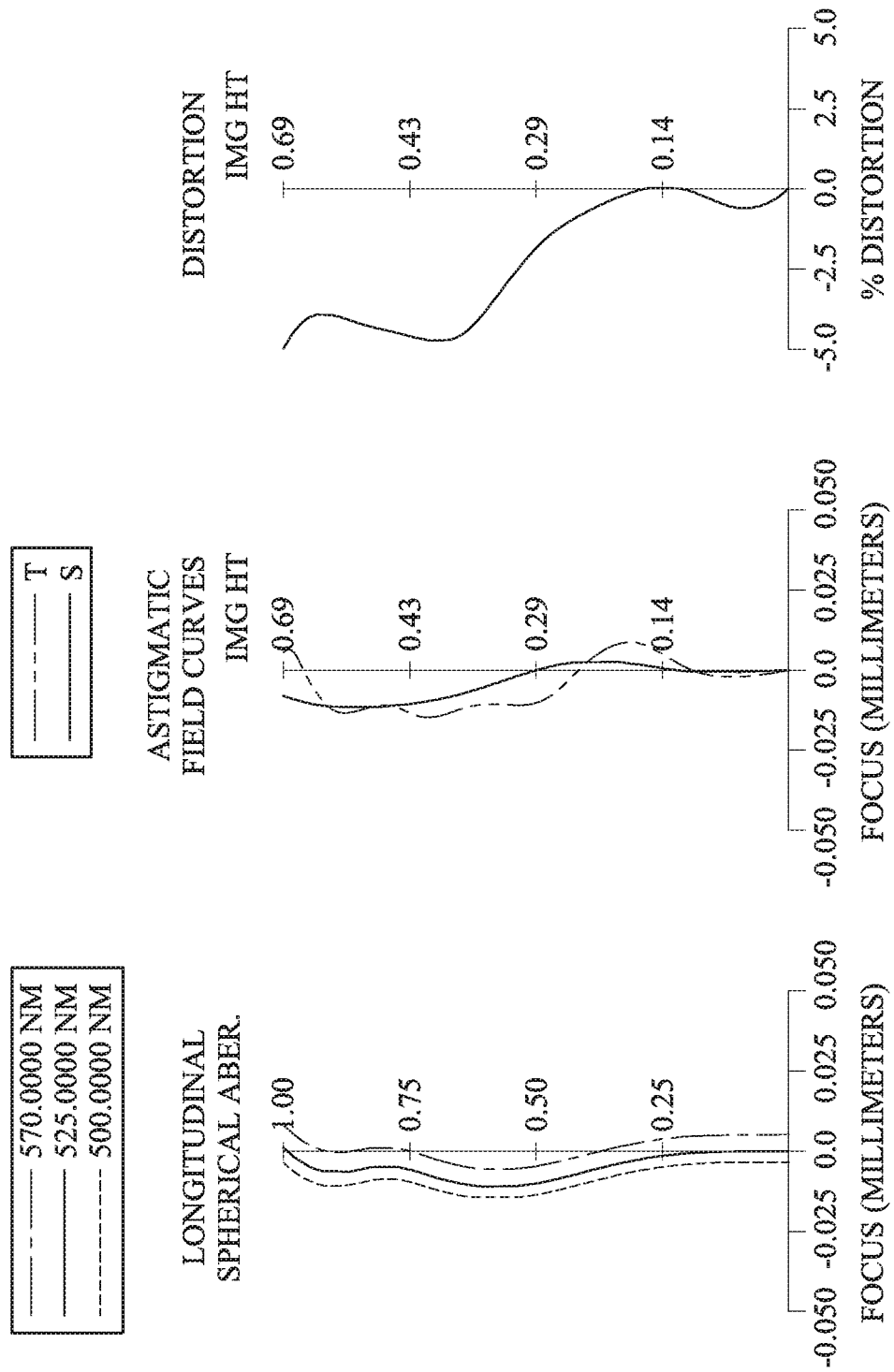
FIG. 9 shows spherical aberration curves, astigmatic field curves and a distortion curve of the image capturing unit according to the 3rd embodiment.

FIG. 7 is a schematic view of an identification module according to the 3rd embodiment of the present disclosure. FIG. 8 is a partially enlarged view of FIG. 7. FIG. 9 shows, in order from left to right, spherical aberration curves, astigmatic field curves and a distortion curve of the image capturing unit according to the 3rd embodiment. In FIG. 7 and FIG. 8, the identification module includes the imaging lens system (its reference numeral is omitted) of the present disclosure, an optical window 350, a cover glass 360 and an image sensor 380. The imaging lens system includes, in order from an object side to an image side, a first lens element 310, a second lens element 320, an aperture stop 300, a third lens element 330, a stop 301, a fourth lens element 340 and an image surface 370. The imaging lens system includes four lens elements (310, 320, 330 and 340) with no additional lens element disposed between each of the adjacent four lens elements.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has two inflection points. The image-side surface 312 of the first lens element 310 has two inflection points.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has one inflection point. The image-side surface 322 of the second lens element 320 has one inflection point.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The image-side surface 332 of the third lens element 330 has one inflection point.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has two inflection points.

The optical window 350 is a light-permeable substrate and located between the imaged object O and the first lens element 310 (i.e., the object side of the first lens element 310), and will not affect the focal length of the imaging lens system. The cover glass 360 is a glass panel and located between the fourth lens element 340 and the image surface 370 (i.e., the image side of the fourth lens element 340), and will not affect the focal length of the imaging lens system. The image sensor 380 is disposed on or near the image surface 370 of the imaging lens system.

The detailed optical data of the 3rd embodiment are shown in Table 5 and the aspheric surface data are shown in Table 6 below.

TABLE 5

3rd Embodiment
f = 0.38 mm, Fno(work) = 1.42, Fno(inf.) = 1.38, HFOV = 64.1 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.099 | | | | |
| 3 | Lens 1 | 0.806 | (ASP) | 0.809 | Plastic | 1.538 | 55.9 | −0.97 |
| 4 | | 0.206 | (ASP) | 1.004 | | | | |
| 5 | Lens 2 | 12.013 | (ASP) | 0.210 | Plastic | 1.548 | 56.0 | 10.85 |
| 6 | | −11.682 | (ASP) | 0.276 | | | | |
| 7 | Ape. Stop | Plano | | −0.019 | | | | |
| 8 | Lens 3 | 3.272 | (ASP) | 0.295 | Plastic | 1.548 | 56.0 | 1.92 |
| 9 | | −1.501 | (ASP) | 0.066 | | | | |
| 10 | Stop | Plano | | 0.012 | | | | |
| 11 | Lens 4 | 0.886 | (ASP) | 0.520 | Plastic | 1.548 | 56.0 | 0.88 |
| 12 | | −0.834 | (ASP) | 0.300 | | | | |
| 13 | Cover Glass | Plano | | 0.210 | Glass | 1.520 | 64.2 | — |
| 14 | | Plano | | 0.218 | | | | |
| 15 | Image | Plano | | — | | | | |

Note:
Reference wavelength is 525 nm.
The working distance is the axial distance (1.599 mm) between the imaged object O (Surface 0) and the object-side surface 311 (Surface 3).
An effective radius of the stop 301 (Surface 10) is 0.430 mm.

TABLE 6

Aspheric Coefficients

| Surface # | 3 | 4 | 5 | 6 |
|---|---|---|---|---|
| k = | −1.0000E+00 | −1.0000E+00 | 0.0000E+00 | 0.0000E+00 |
| A4 = | −7.1010E−01 | −7.1658E+00 | −2.5274E+00 | −1.0043E+00 |
| A6 = | 4.5784E−01 | 6.0799E+01 | 1.6545E+01 | 1.8231E+01 |
| A8 = | −1.7508E−01 | −4.0241E+02 | −4.7196E+01 | 3.4024E+02 |
| A10 = | 4.2210E−02 | 1.5021E+03 | 3.8518E+01 | −6.3125E+03 |
| A12 = | −6.3312E−03 | −2.9641E+03 | 2.4543E+01 | 4.3577E+04 |
| A14 = | 5.4835E−04 | 2.8882E+03 | — | −9.7108E+04 |
| A16 = | −2.1283E−05 | −1.0928E+03 | — | — |

| Surface # | 8 | 9 | 11 | 12 |
|---|---|---|---|---|
| k = | 0.0000E+00 | −1.9971E+01 | −4.5571E−01 | −2.7608E−01 |
| A4 = | 1.0773E+00 | −2.4786E+00 | −2.6405E+00 | 8.5451E−01 |
| A6 = | 6.7775E+00 | 3.2120E+00 | 1.5718E+01 | −1.0325E+01 |
| A8 = | −4.7767E+01 | 5.1290E+02 | −9.8604E+01 | 1.0064E+02 |
| A10 = | 1.0749E+03 | −7.3955E+03 | 3.4439E+02 | −6.6266E+02 |
| A12 = | −4.6925E+03 | 4.6490E+04 | −4.7994E+02 | 2.3749E+03 |
| A14 = | — | −9.6249E+04 | 1.2446E+02 | −4.3735E+03 |
| A16 = | — | — | — | 3.2816E+03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| | | | |
|---|---|---|---|
| f [mm] | 0.38 | (OL − CTf)/(BL − CTr) | 0.19 |
| Fno(work) | 1.42 | SL/TL | 0.41 |
| Fno(inf.) | 1.38 | TL/f | 10.14 |
| HFOV [deg.] | 64.1 | ImgH/f | 1.51 |
| CT1/CT2 | 3.85 | TL [mm] | 3.90 |
| ATmax/CTmin | 4.78 | TL/ImgH | 6.73 |
| (R7 + R8)/(R7 − R8) | 0.03 | Y12/R2 | 3.66 |
| \|f1/f2\| | 0.09 | SAG12/R2 | 4.07 |
| \|f4/f2\| | 0.08 | Vmax − Vmin | 0.1 |
| \|f/f1\| − \|f/f2\| − \|f/f3\| | 0.16 | f/[EPD × tan(HFOV)] | 0.67 |
| f/EPD | 1.38 | Y11cx/Y11ca | — |
| CTf/TD | 0.47 | Y11/Y42 | 3.77 |

4th Embodiment

Figure 10:
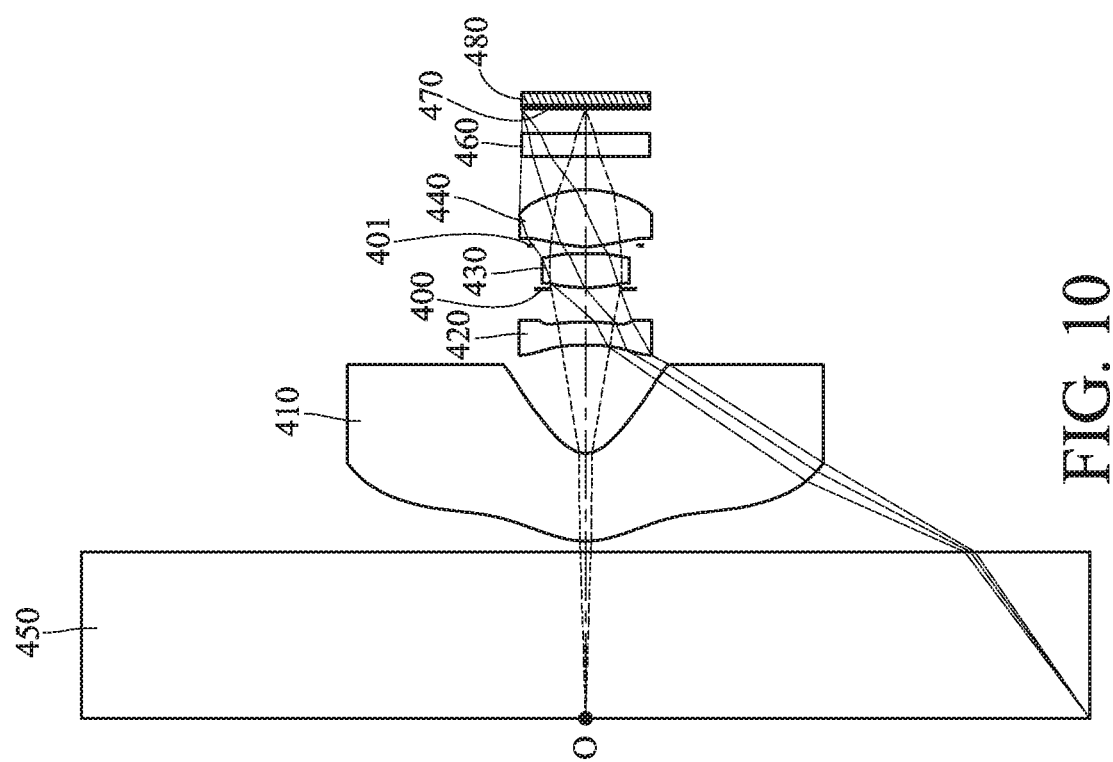
FIG. 10 is a schematic view of an identification module according to the 4th embodiment of the present disclosure.
Figure 11:
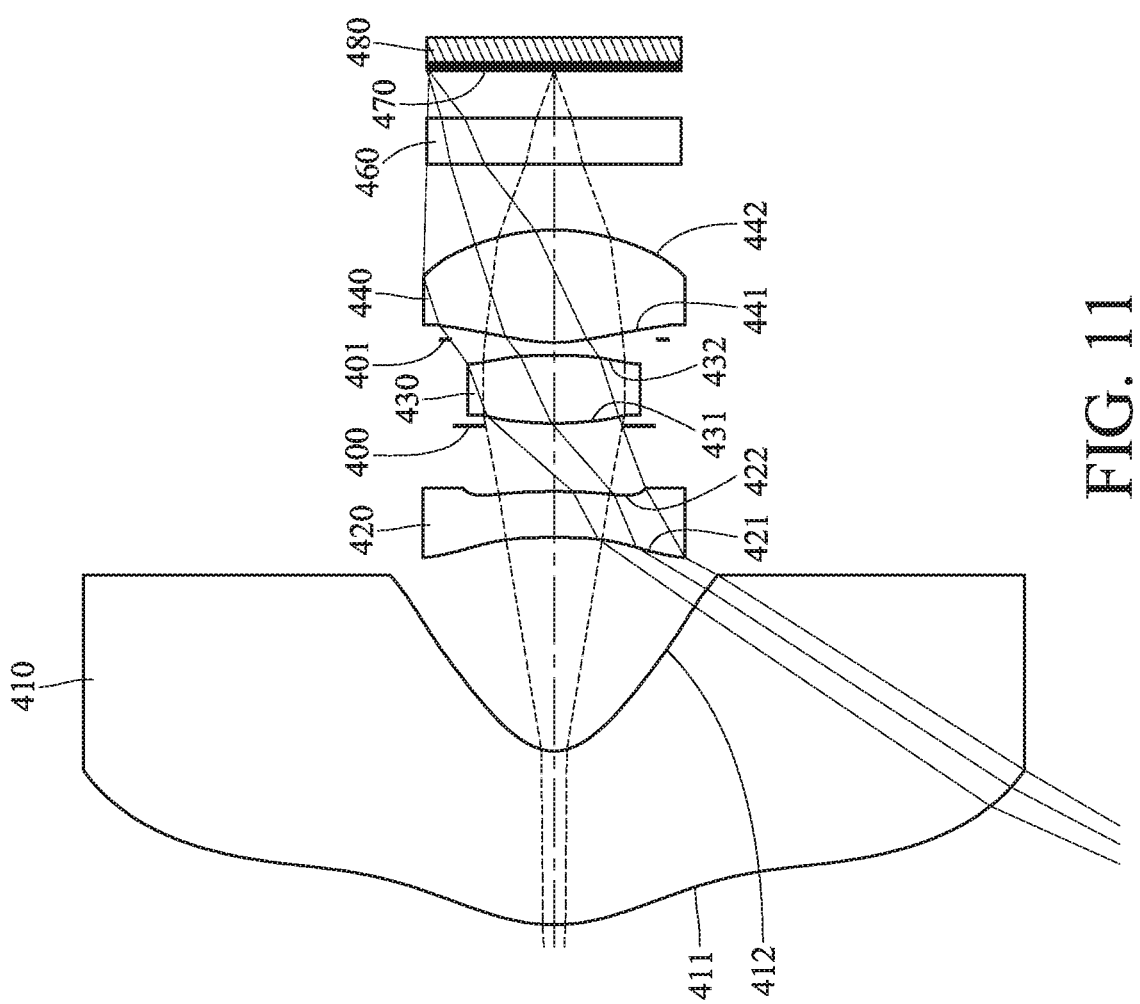
FIG. 11 is a partially enlarged view of FIG. 10.
Figure 12:
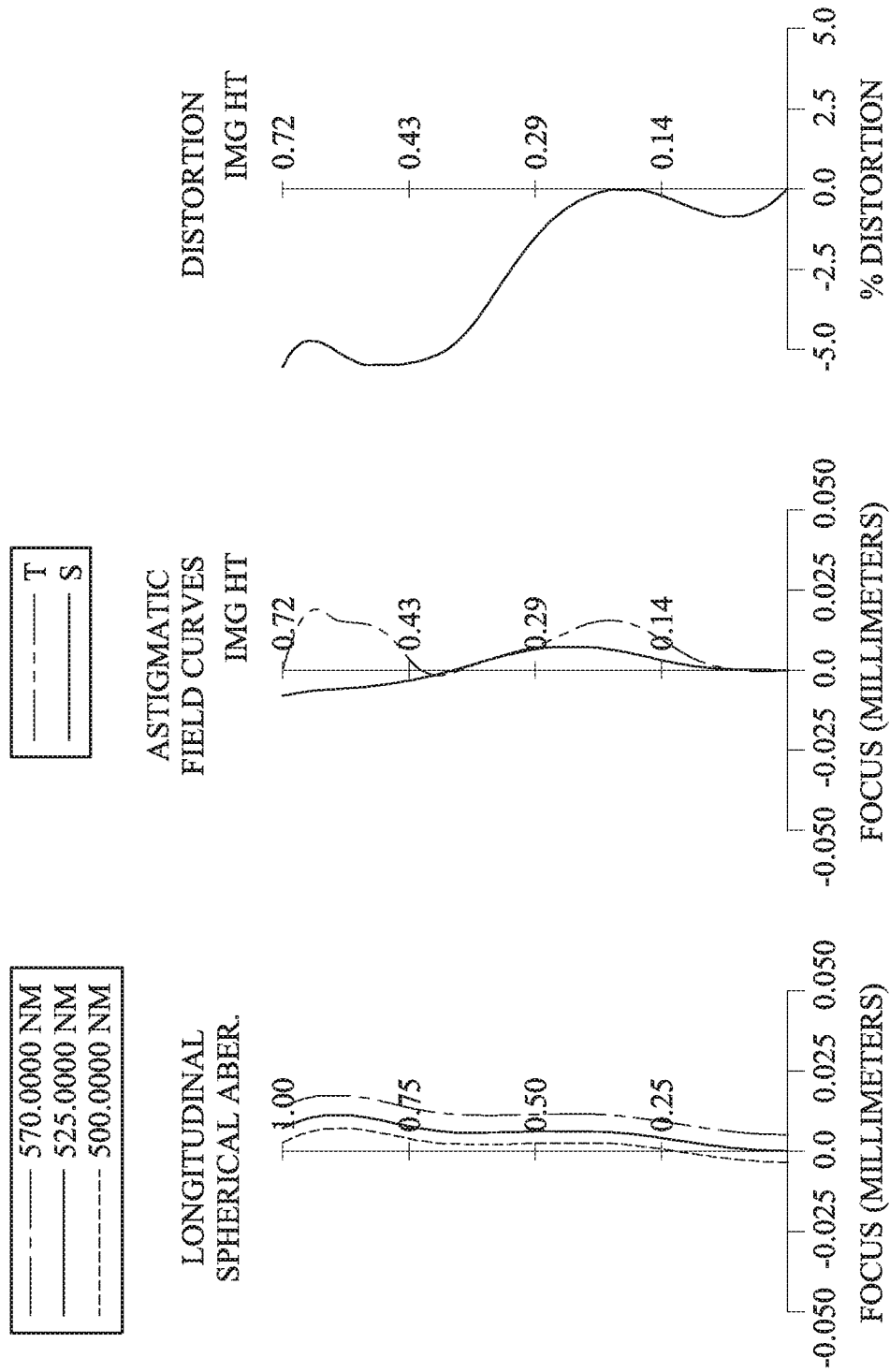
FIG. 12 shows spherical aberration curves, astigmatic field curves and a distortion curve of the image capturing unit according to the 4th embodiment.

FIG. 10 is a schematic view of an identification module according to the 4th embodiment of the present disclosure. FIG. 11 is a partially enlarged view of FIG. 10. FIG. 12 shows, in order from left to right, spherical aberration curves, astigmatic field curves and a distortion curve of the image capturing unit according to the 4th embodiment. In FIG. 10 and FIG. 11, the identification module includes the imaging lens system (its reference numeral is omitted) of the present disclosure, an optical window 450, a cover glass 460 and an image sensor 480. The imaging lens system includes, in order from an object side to an image side, a first lens element 410, a second lens element 420, an aperture stop 400, a third lens element 430, a stop 401, a fourth lens element 440 and an image surface 470. The imaging lens system includes four lens elements (410, 420, 430 and 440) with no additional lens element disposed between each of the adjacent four lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has two inflection points. The image-side surface 412 of the first lens element 410 has two inflection points.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has two inflection points. The image-side surface 422 of the second lens element 420 has one inflection point.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The image-side surface 432 of the third lens element 430 has one inflection point.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has two inflection points.

The optical window 450 is a light-permeable substrate and located between the imaged object O and the first lens element 410 (i.e., the object side of the first lens element 410), and will not affect the focal length of the imaging lens system. The cover glass 460 is a glass panel and located between the fourth lens element 440 and the image surface 470 (i.e., the image side of the fourth lens element 440), and will not affect the focal length of the imaging lens system. The image sensor 480 is disposed on or near the image surface 470 of the imaging lens system.

The detailed optical data of the 4th embodiment are shown in Table 7 and the aspheric surface data are shown in Table 8 below.

TABLE 7

4th Embodiment
f = 0.38 mm, Fno(work) = 1.42, Fno(inf.) = 1.37, HFOV = 62.3 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.100 | | | | |
| 3 | Lens 1 | 0.789 | (ASP) | 0.793 | Plastic | 1.538 | 55.9 | −0.99 |
| 4 | | 0.206 | (ASP) | 0.976 | | | | |
| 5 | Lens 2 | −4.243 | (ASP) | 0.210 | Plastic | 1.548 | 56.0 | 15.31 |
| 6 | | −2.867 | (ASP) | 0.298 | | | | |
| 7 | Ape. Stop | Plano | | 0.013 | | | | |
| 8 | Lens 3 | 1.568 | (ASP) | 0.309 | Plastic | 1.548 | 56.0 | 2.37 |
| 9 | | −7.020 | (ASP) | 0.073 | | | | |
| 10 | Stop | Plano | | −0.013 | | | | |
| 11 | Lens 4 | 0.701 | (ASP) | 0.514 | Plastic | 1.548 | 56.0 | 0.81 |
| 12 | | −0.888 | (ASP) | 0.300 | | | | |
| 13 | Cover Glass | Plano | | 0.210 | Glass | 1.520 | 64.2 | — |
| 14 | | Plano | | 0.217 | | | | |
| 15 | Image | Plano | | — | | | | |

Note:
Reference wavelength is 525 nm.
The working distance is the axial distance (1.600 mm) between the imaged object O (Surface 0) and the object-side surface 411 (Surface 3).
An effective radius of the stop 401 (Surface 10) is 0.475 mm.

TABLE 8

Aspheric Coefficients

| Surface # | 3 | 4 | 5 | 6 |
|---|---|---|---|---|
| k = | −1.0000E+00 | −1.0000E+00 | 1.2908E+01 | 0.0000E+00 |
| A4 = | −6.6691E−01 | −5.7225E+00 | −2.7807E+00 | −1.0284E+00 |

TABLE 8-continued

| Aspheric Coefficients | | | | |
|---|---|---|---|---|
| A6 = | 3.9285E−01 | 4.0347E+01 | 1.1078E+01 | −4.4899E+00 |
| A8 = | −1.2988E+00 | −2.6066E+02 | −9.0704E+00 | 4.2219E+02 |
| A10 = | 2.4114E−02 | 9.7612E+02 | −1.6746E+01 | −4.7977E+03 |
| A12 = | −2.0823E−03 | −1.9615E+03 | 2.2700E+01 | 2.4592E+04 |
| A14 = | 6.9331E−06 | 1.9725E+03 | — | −4.2388E+04 |
| A16 = | 7.8490E−06 | −7.7985E+02 | — | — |

| Surface # | 8 | 9 | 11 | 12 |
|---|---|---|---|---|
| k = | −1.9279E+00 | 4.0016E+01 | −1.0433E+00 | 1.4762E−01 |
| A4 = | −7.3903E−01 | −5.2994E+00 | −4.9462E+00 | 1.1745E+00 |
| A6 = | 2.3421E+01 | 4.4008E+01 | 3.5206E+01 | −1.0600E+01 |
| A8 = | −2.5161E+02 | −1.2204E+02 | −1.6614E+02 | 7.4480E+01 |
| A10 = | 1.7697E+03 | −5.2678E+02 | 4.3339E+02 | −2.9439E+02 |
| A12 = | −4.5973E+03 | 5.2746E+03 | −5.3776E+02 | 5.5759E+02 |
| A14 = | — | −8.5277E+03 | 2.2659E+02 | −4.1030E+02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.38 | (OL − CTf)/(BL − CTr) | 0.19 |
| Fno(work) | 1.42 | SL/TL | 0.42 |
| Fno(inf.) | 1.37 | TL/f | 10.19 |
| HFOV [deg.] | 62.3 | ImgH/f | 1.52 |
| CT1/CT2 | 3.78 | TL [mm] | 3.90 |
| ATmax/CTmin | 4.65 | TL/ImgH | 6.72 |
| (R7 + R8)/(R7 − R8) | −0.12 | Y12/R2 | 3.63 |
| |f1/f2| | 0.06 | SAG12/R2 | 3.90 |
| |f4/f2| | 0.05 | Vmax − Vmin | 0.1 |
| ||f/f1| − |f/f2| − |f/f3|| | 0.20 | f/[EPD × tan(HFOV)] | 0.72 |
| f/EPD | 1.37 | Y11cx/Y11ca | — |
| CTf/TD | 0.47 | Y11/Y42 | 3.60 |

5th Embodiment

Figure 13:
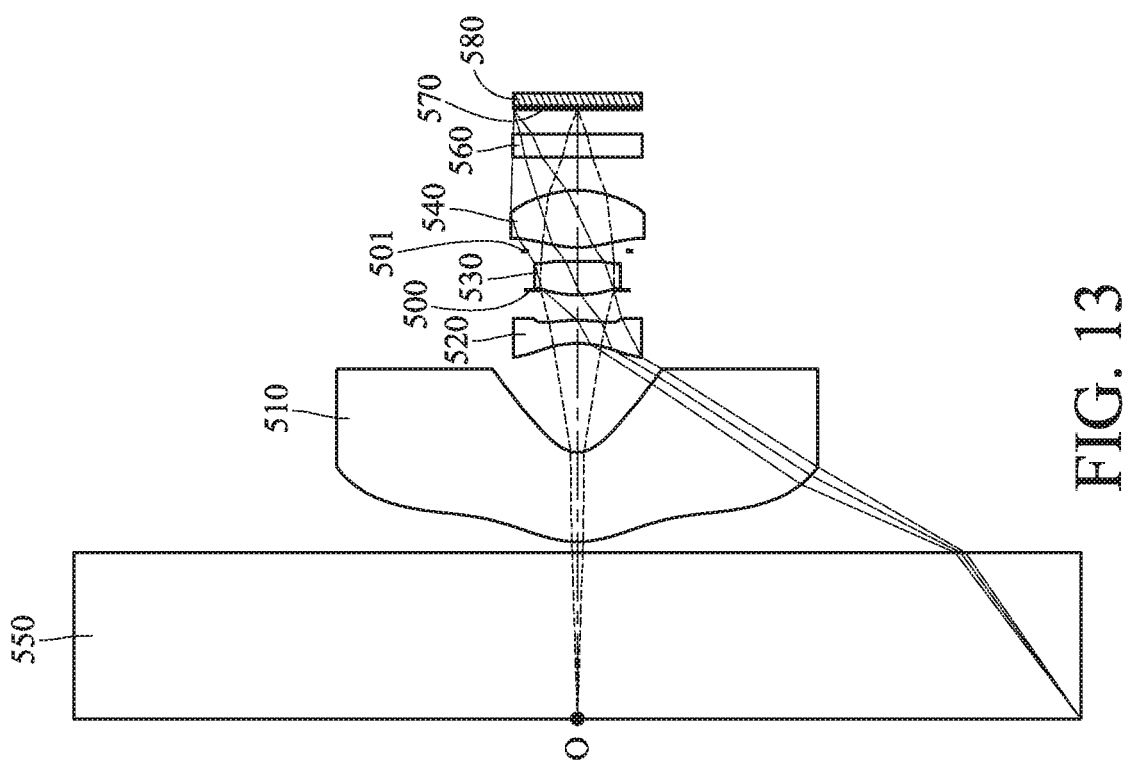
FIG. 13 is a schematic view of an identification module according to the 5th embodiment of the present disclosure.
Figure 14:
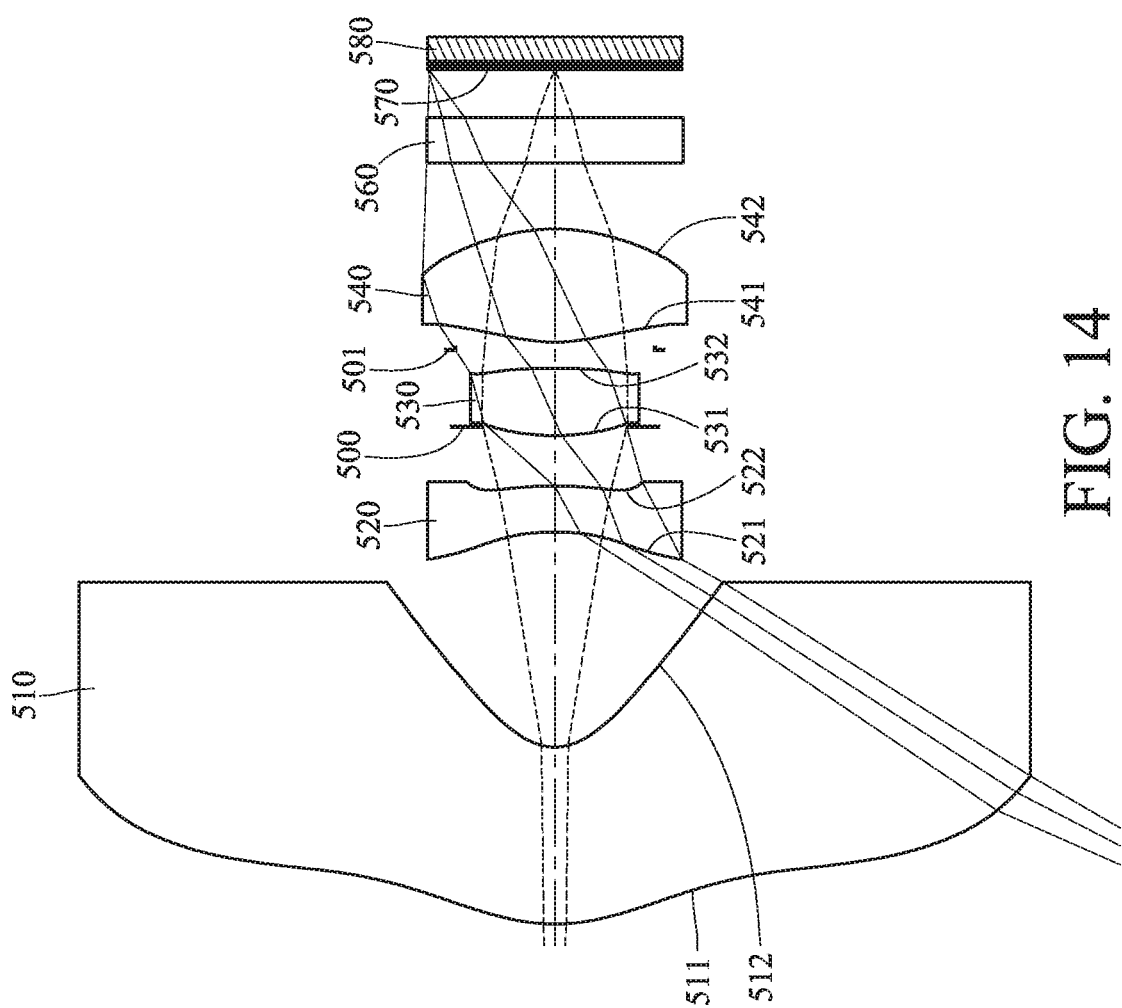
FIG. 14 is a partially enlarged view of FIG. 13.
Figure 15:
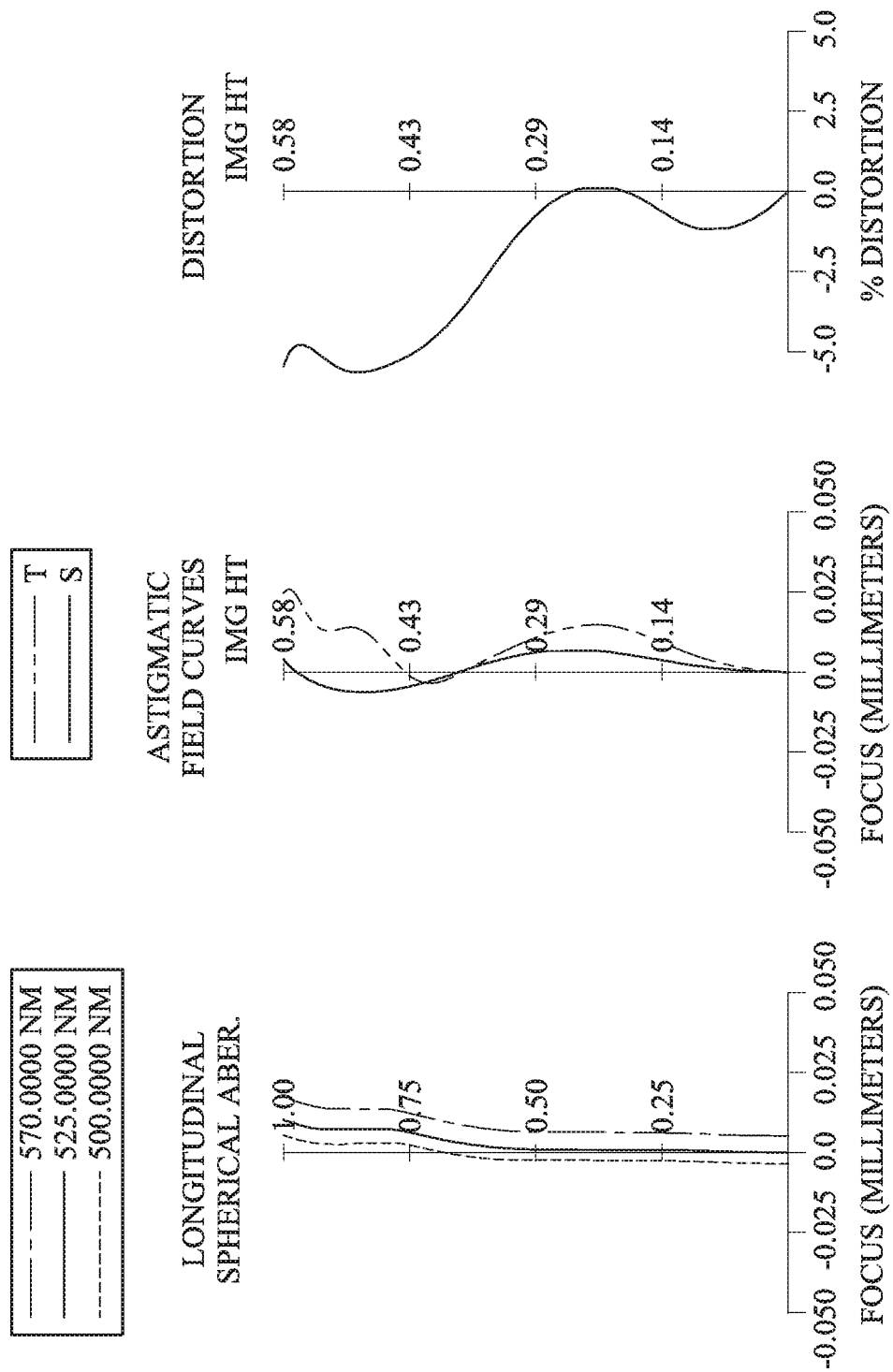
FIG. 15 shows spherical aberration curves, astigmatic field curves and a distortion curve of the image capturing unit according to the 5th embodiment.

FIG. 13 is a schematic view of an identification module according to the 5th embodiment of the present disclosure. FIG. 14 is a partially enlarged view of FIG. 13. FIG. 15 shows, in order from left to right, spherical aberration curves, astigmatic field curves and a distortion curve of the image capturing unit according to the 5th embodiment. In FIG. 13 and FIG. 14, the identification module includes the imaging lens system (its reference numeral is omitted) of the present disclosure, an optical window 550, a cover glass 560 and an image sensor 580. The imaging lens system includes, in order from an object side to an image side, a first lens element 510, a second lens element 520, an aperture stop 500, a third lens element 530, a stop 501, a fourth lens element 540 and an image surface 570. The imaging lens system includes four lens elements (510, 520, 530 and 540) with no additional lens element disposed between each of the adjacent four lens elements.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has two inflection points. The image-side surface 512 of the first lens element 510 has one inflection point.

The second lens element 520 with negative refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has two inflection points. The image-side surface 522 of the second lens element 520 has one inflection point.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. The image-side surface 532 of the third lens element 530 has one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has one inflection point.

The optical window 550 is a light-permeable substrate and located between the imaged object O and the first lens element 510 (i.e., the object side of the first lens element 510), and will not affect the focal length of the imaging lens system. The cover glass 560 is a glass panel and located between the fourth lens element 540 and the image surface 570 (i.e., the image side of the fourth lens element 540), and will not affect the focal length of the imaging lens system. The image sensor 580 is disposed on or near the image surface 570 of the imaging lens system.

The detailed optical data of the 5th embodiment are shown in Table 9 and the aspheric surface data are shown in Table 10 below.

TABLE 9

5th Embodiment
f = 0.38 mm, Fno(work) = 1.41, Fno(inf.) = 1.36, HFOV = 62.7 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.098 | | | | |
| 3 | Lens 1 | 0.872 | (ASP) | 0.808 | Plastic | 1.538 | 55.9 | −1.03 |
| 4 | | 0.229 | (ASP) | 0.982 | | | | |
| 5 | Lens 2 | −1.298 | (ASP) | 0.210 | Plastic | 1.548 | 56.0 | −5.91 |
| 6 | | −2.293 | (ASP) | 0.270 | | | | |
| 7 | Ape. Stop | Plano | | −0.040 | | | | |
| 8 | Lens 3 | 0.977 | (ASP) | 0.306 | Plastic | 1.548 | 56.0 | 1.73 |
| 9 | | −28.421 | (ASP) | 0.087 | | | | |
| 10 | Stop | Plano | | 0.034 | | | | |
| 11 | Lens 4 | 0.731 | (ASP) | 0.517 | Plastic | 1.548 | 56.0 | 0.81 |
| 12 | | −0.842 | (ASP) | 0.300 | | | | |
| 13 | Cover Glass | Plano | | 0.210 | Glass | 1.520 | 64.2 | — |
| 14 | | Plano | | 0.218 | | | | |
| 15 | Image | Plano | | — | | | | |

Note:
Reference wavelength is 525 nm.
The working distance is the axial distance (1.598 mm) between the imaged object O (Surface 0) and the object-side surface 511 (Surface 3).
An effective radius of the stop 501 (Surface 10) is 0.455 mm.

TABLE 10

Aspheric Coefficients

| Surface # | 3 | 4 | 5 | 6 |
|---|---|---|---|---|
| k = | −1.0000E+00 | −1.0000E+00 | 0.0000E+00 | 0.0000E+00 |
| A4 = | −5.8079E−01 | −3.6336E+00 | −3.8565E+00 | −2.6447E+00 |
| A6 = | 3.4199E−01 | 1.3790E+01 | 3.2752E+01 | 4.3307E+01 |
| A8 = | −1.2047E−01 | −7.2959E+01 | −1.0978E+02 | −1.8621E+02 |
| A10 = | 2.6841E−02 | 2.4425E+02 | 1.8404E+02 | 1.9396E+02 |
| A12 = | −3.6955E−03 | −4.3479E+02 | −1.2864E+02 | 5.2436E+03 |
| A14 = | 2.8889E−04 | 3.8523E+02 | — | −1.5422E+04 |
| A16 = | −9.5373E−06 | −1.3441E+02 | | |

| Surface # | 8 | 9 | 11 | 12 |
|---|---|---|---|---|
| k = | 2.7911E+00 | 0.0000E+00 | −1.0000E+00 | 0.0000E+00 |
| A4 = | −1.9999E+00 | −3.9808E+00 | −3.2081E+00 | 1.1945E+00 |
| A6 = | 2.2029E+01 | 2.2378E+01 | 1.4196E+01 | −7.4495E+00 |
| A8 = | −1.6596E+02 | 5.8115E+01 | −5.6957E+01 | 4.1097E+01 |
| A10 = | 1.1270E+03 | −1.6273E+03 | 1.8505E+02 | −1.2863E+02 |
| A12 = | −3.1487E+03 | 1.0570E+04 | −3.8416E+02 | 1.8953E+02 |
| A14 = | — | −1.8076E+04 | 3.4631E+02 | −1.1358E+02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.38 | (OL − CTf)/(BL − CTr) | 0.19 |
| Fno(work) | 1.41 | SL/TL | 0.42 |
| Fno(inf.) | 1.36 | TL/f | 10.39 |
| HFOV [deg.] | 62.7 | ImgH/f | 1.54 |
| CT1/CT2 | 3.85 | TL [mm] | 3.90 |
| ATmax/CTmin | 4.68 | TL/ImgH | 6.73 |
| (R7 + R8)/(R7 − R8) | −0.07 | Y12/R2 | 3.36 |
| \|f1/f2\| | 0.17 | SAG12/R2 | 3.29 |
| \|f4/f2\| | 0.14 | Vmax − Vmin | 0.1 |
| \|f/f1\| − \|f/f2\| − \|f/f3\| | 0.08 | f/[EPD × tan(HFOV)] | 0.70 |
| f/EPD | 1.36 | Y11cx/Y11ca | — |
| CTf/TD | 0.47 | Y11/Y42 | 3.60 |

6th Embodiment

Figure 16:
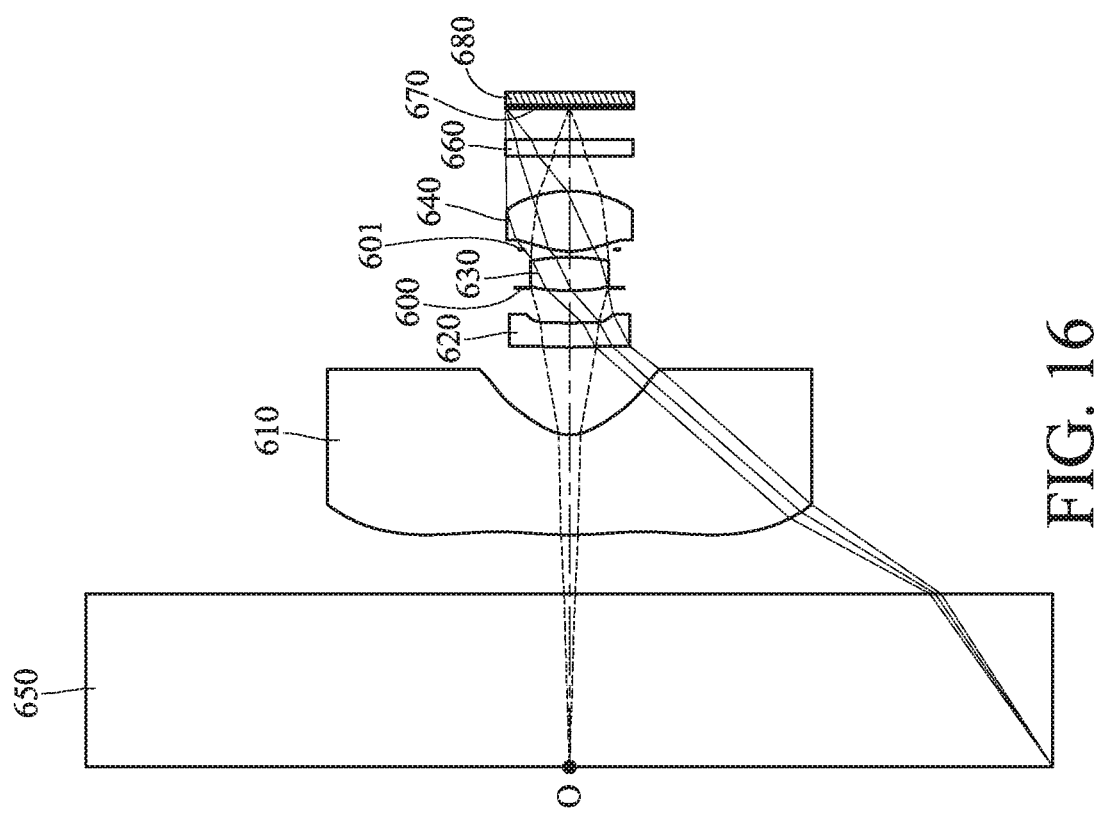
FIG. 16 is a schematic view of an identification module according to the 6th embodiment of the present disclosure.
Figure 17:
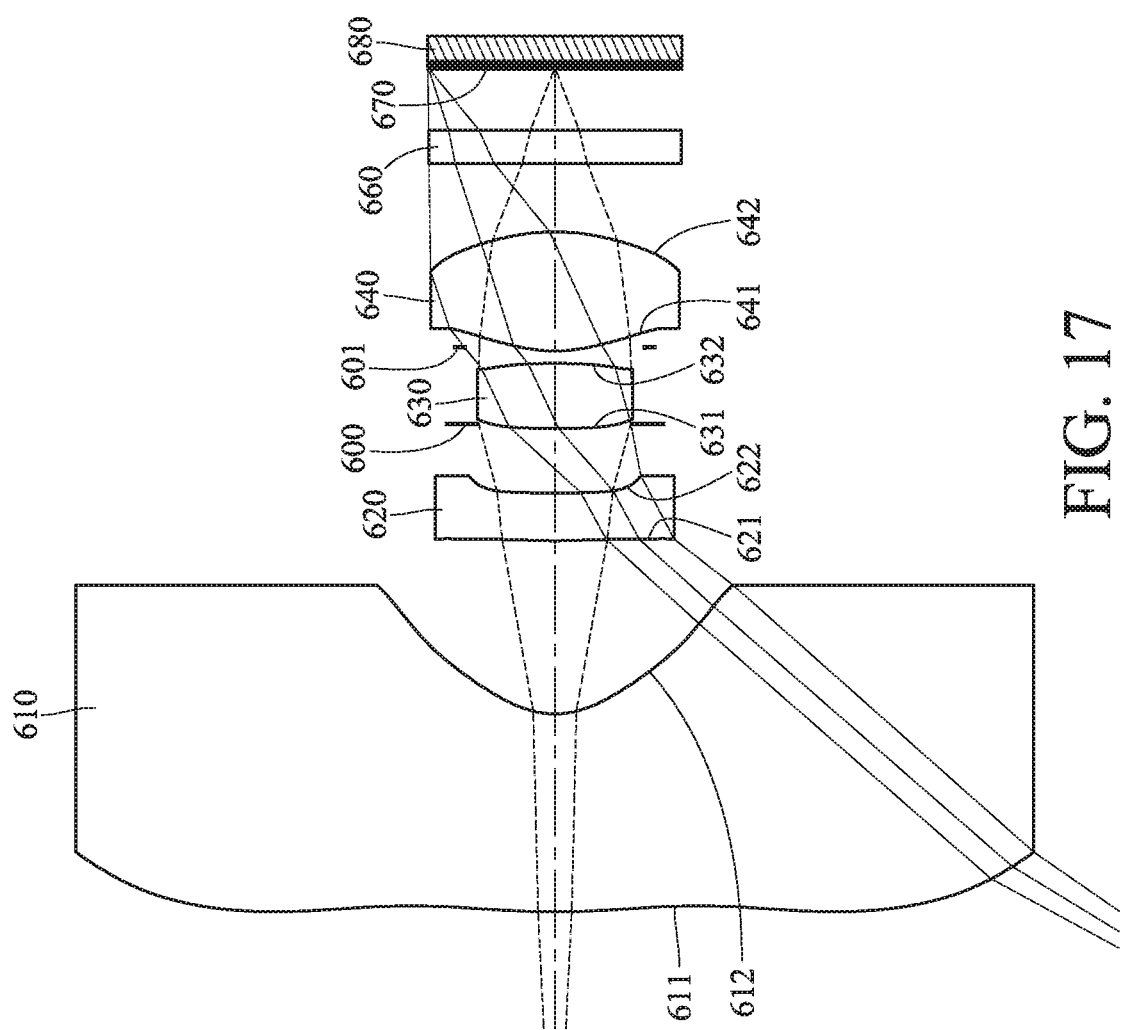
FIG. 17 is a partially enlarged view of FIG. 16.
Figure 18:
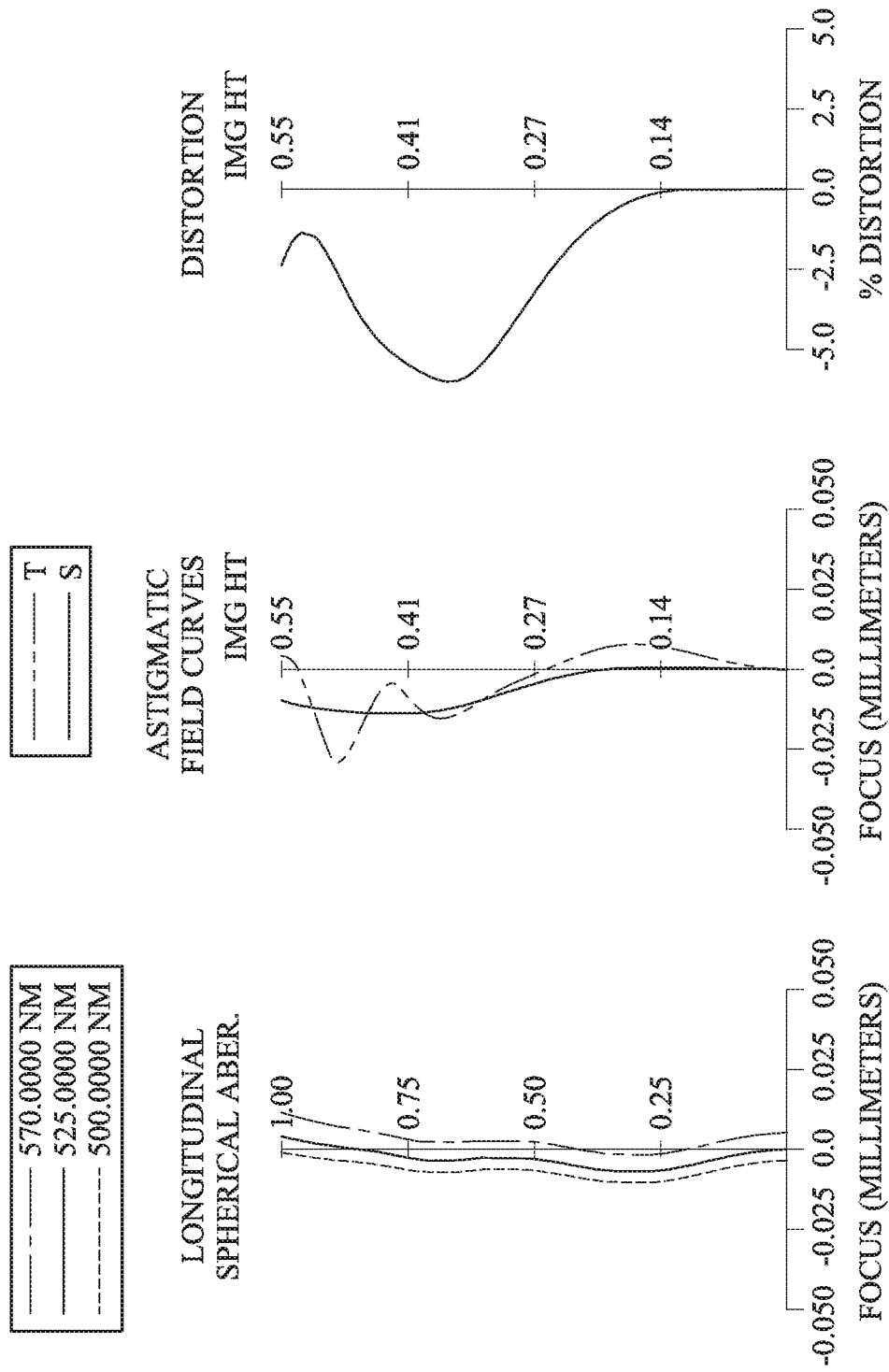
FIG. 18 shows spherical aberration curves, astigmatic field curves and a distortion curve of the image capturing unit according to the 6th embodiment.

FIG. 16 is a schematic view of an identification module according to the 6th embodiment of the present disclosure. FIG. 17 is a partially enlarged view of FIG. 16. FIG. 18 shows, in order from left to right, spherical aberration curves, astigmatic field curves and a distortion curve of the image capturing unit according to the 6th embodiment. In FIG. 16 and FIG. 17, the identification module includes the imaging lens system (its reference numeral is omitted) of the present disclosure, an optical window 650, a cover glass 660 and an image sensor 680. The imaging lens system includes, in order from an object side to an image side, a first lens element 610, a second lens element 620, an aperture stop 600, a third lens element 630, a stop 601, a fourth lens element 640 and an image surface 670. The imaging lens system includes four lens elements (610, 620, 630 and 640) with no additional lens element disposed between each of the adjacent four lens elements.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has two inflection points. The image-side surface 612 of the first lens element 610 has one inflection point. The object-side surface 611 of the first lens element 610 has at least one convex critical point and at least one concave critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has three inflection points.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The image-side surface 632 of the third lens element 630 has one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has one inflection point.

The optical window 650 is a light-permeable substrate and located between the imaged object O and the first lens element 610 (i.e., the object side of the first lens element 610), and will not affect the focal length of the imaging lens system. The cover glass 660 is a glass panel and located between the fourth lens element 640 and the image surface 670 (i.e., the image side of the fourth lens element 640), and will not affect the focal length of the imaging lens system. The image sensor 680 is disposed on or near the image surface 670 of the imaging lens system.

The detailed optical data of the 6th embodiment are shown in Table 11 and the aspheric surface data are shown in Table 12 below.

TABLE 11

6th Embodiment
f = 0.35 mm, Fno(work) = 1.38, Fno(inf.) = 1.34, HFOV = 58.6 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.510 | | | | |
| 3 | Lens 1 | 3.142 | (ASP) | 0.866 | Plastic | 1.548 | 56.0 | −0.85 |
| 4 | | 0.365 | (ASP) | 0.758 | | | | |
| 5 | Lens 2 | 2.160 | (ASP) | 0.209 | Plastic | 1.572 | 37.4 | 7.23 |
| 6 | | 4.365 | (ASP) | 0.302 | | | | |
| 7 | Ape. Stop | Plano | | −0.019 | | | | |
| 8 | Lens 3 | 4.887 | (ASP) | 0.285 | Plastic | 1.548 | 56.0 | 4.50 |
| 9 | | −4.864 | (ASP) | 0.070 | | | | |
| 10 | Stop | Plano | | −0.016 | | | | |
| 11 | Lens 4 | 0.591 | (ASP) | 0.522 | Plastic | 1.548 | 56.0 | 0.73 |
| 12 | | −0.847 | (ASP) | 0.300 | | | | |
| 13 | Cover Glass | Plano | | 0.145 | Glass | 1.520 | 64.2 | — |
| 14 | | Plano | | 0.268 | | | | |
| 15 | Image | Plano | | — | | | | |

Note:
Reference wavelength is 525 nm.
The working distance is the axial distance (2.010 mm) between the imaged object O (Surface 0) and the object-side surface 611 (Surface 3).
An effective radius of the stop 601 (Surface 10) is 0.395 mm.

TABLE 12

Aspheric Coefficients

| Surface # | 3 | 4 | 5 | 6 |
|---|---|---|---|---|
| k = | −1.9583E−01 | −9.9450E−01 | 1.8639E+00 | 5.7217E+01 |
| A4 = | −3.3330E−01 | −2.3095E+00 | −3.4291E+00 | −1.7041E+00 |

TABLE 12-continued

| Aspheric Coefficients | | | | |
|---|---|---|---|---|
| A6 = | 2.6868E−01 | 6.1740E+00 | 2.1228E+01 | 3.6669E+01 |
| A8 = | −1.1307E−01 | −2.7456E+01 | −3.7151E+01 | 2.7261E+01 |
| A10 = | 2.6970E−02 | 1.1973E+02 | −1.3277E+02 | −2.6129E+03 |
| A12 = | −3.3941E−03 | −2.5594E+02 | 5.8767E+02 | 2.4738E+04 |
| A14 = | 1.7598E−04 | 2.4480E+02 | −6.3456E+02 | −6.4476E+04 |
| A16 = | −2.7449E−07 | −8.5287E+01 | — | — |

| Surface # | 8 | 9 | 11 | 12 |
|---|---|---|---|---|
| k = | −1.7048E+01 | 9.9000E+01 | −3.4625E−01 | 5.2768E−01 |
| A4 = | 9.5519E−01 | −7.0206E+00 | −6.1076E+00 | 1.8459E+00 |
| A6 = | 2.0661E+01 | 1.8408E+02 | 7.6537E+01 | −1.6878E+01 |
| A8 = | −2.2311E+02 | −3.6802E+03 | −8.0568E+02 | 1.7683E+02 |
| A10 = | 2.1224E+03 | 4.9831E+04 | 5.3540E+03 | −1.1663E+03 |
| A12 = | −9.6686E+03 | −3.9846E+05 | −2.1547E+04 | 4.1843E+03 |
| A14 = | 1.7095E+04 | 1.7039E+06 | 4.7214E+04 | −7.7606E+03 |
| A16 = | — | −2.9215E+06 | −4.2953E+04 | 5.8441E+03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.35 | (OL − CTf)/(BL − CTr) | 0.90 |
| Fno(work) | 1.38 | SL/TL | 0.42 |
| Fno(inf.) | 1.34 | TL/f | 10.41 |
| HFOV [deg.] | 58.6 | ImgH/f | 1.55 |
| CT1/CT2 | 4.15 | TL [mm] | 3.69 |
| ATmax/CTmin | 3.64 | TL/ImgH | 6.70 |
| (R7 + R8)/(R7 − R8) | −0.18 | Y12/R2 | 2.13 |
| \|f1/f2\| | 0.12 | SAG12/R2 | 1.54 |
| \|f4/f2\| | 0.10 | Vmax − Vmin | 18.5 |
| \|f/f1\| − \|f/f2\| − \|f/f3\| | 0.29 | f/[EPD × tan(HFOV)] | 0.82 |
| f/EPD | 1.34 | Y11cx/Y11ca | 1.95 |
| CTf/TD | 0.50 | Y11/Y42 | 3.85 |

7th Embodiment

Figure 19:
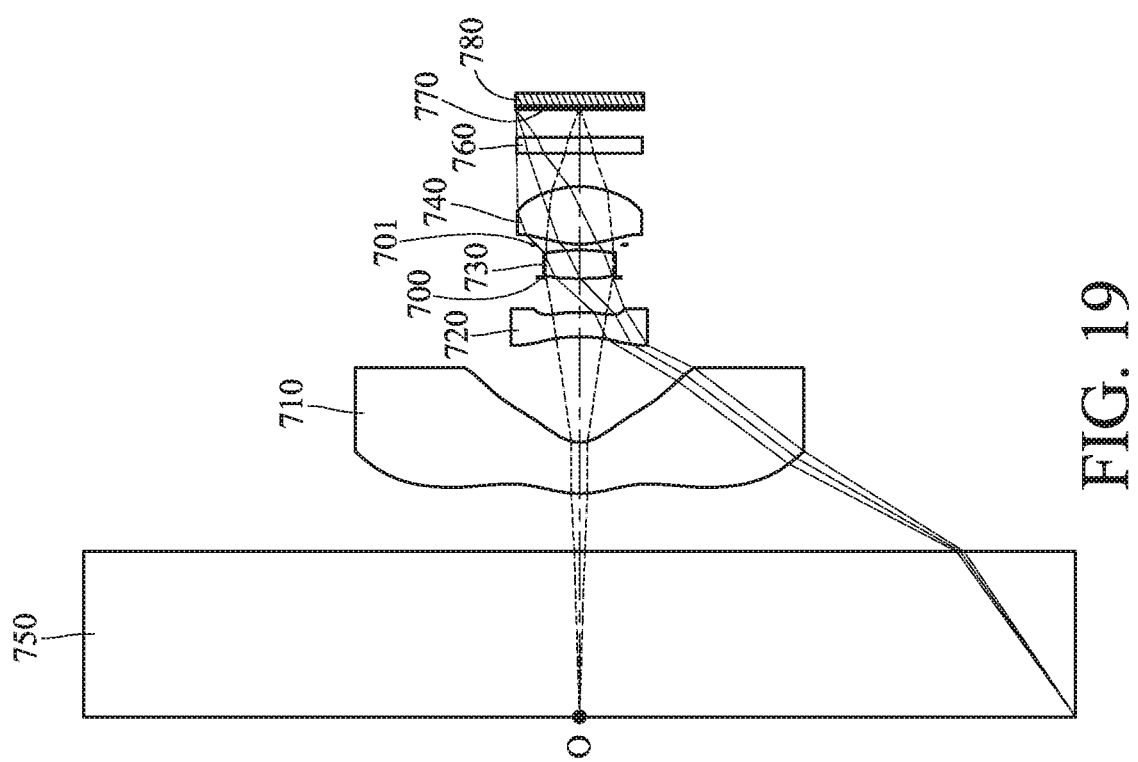
FIG. 19 is a schematic view of an identification module according to the 7th embodiment of the present disclosure.
Figure 20:
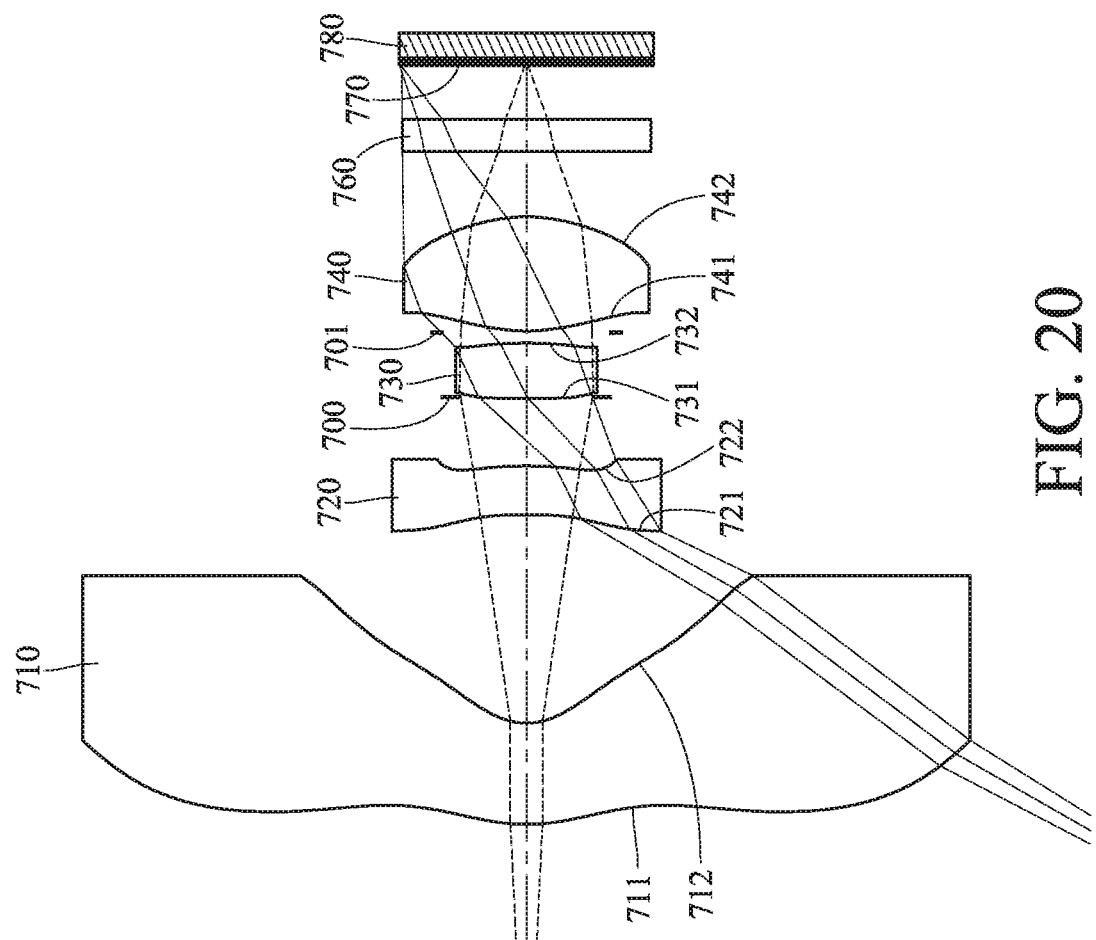
FIG. 20 is a partially enlarged view of FIG. 19.
Figure 21:
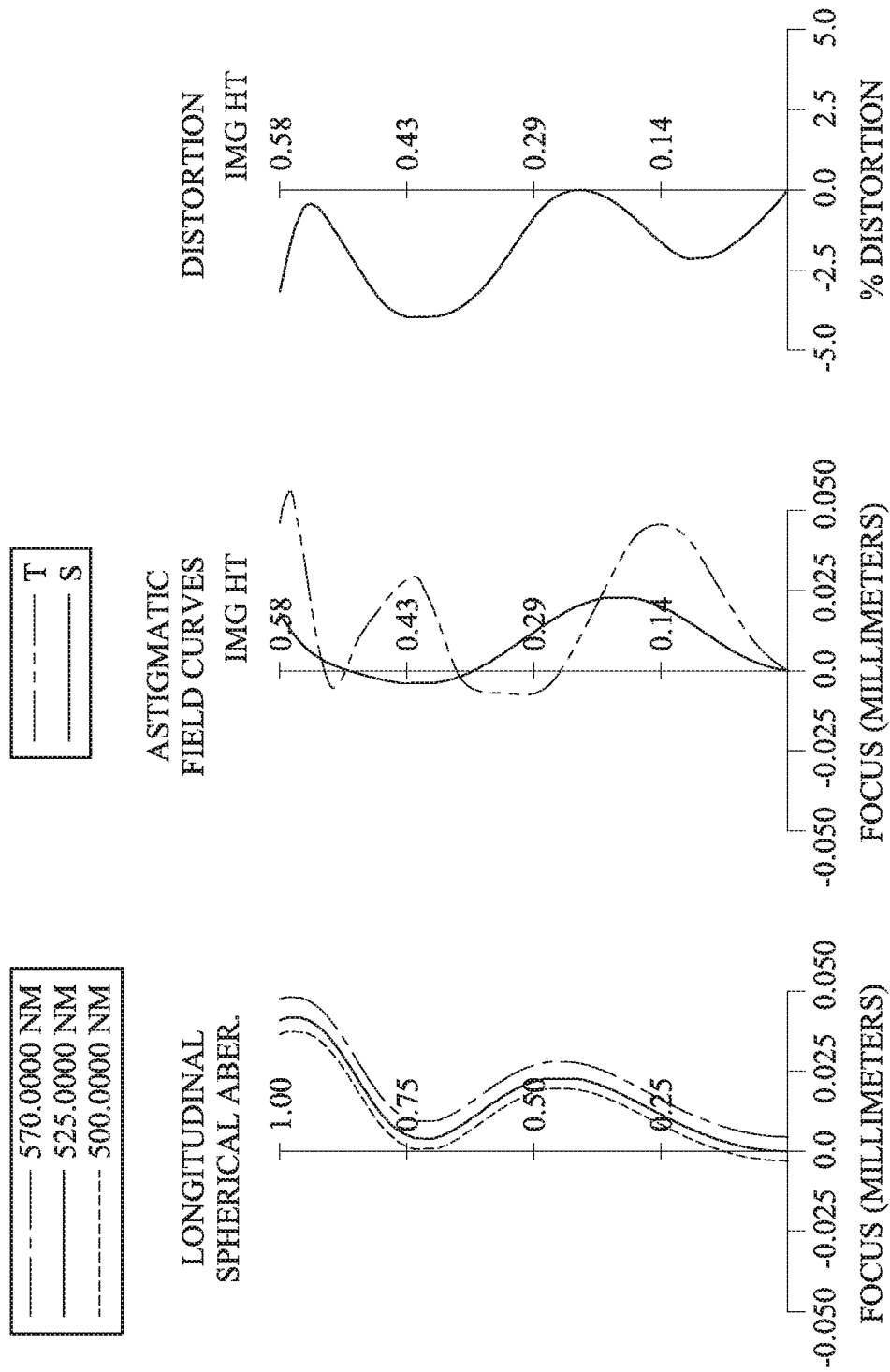
FIG. 21 shows spherical aberration curves, astigmatic field curves and a distortion curve of the image capturing unit according to the 7th embodiment.

FIG. 19 is a schematic view of an identification module according to the 7th embodiment of the present disclosure. FIG. 20 is a partially enlarged view of FIG. 19. FIG. 21 shows, in order from left to right, spherical aberration curves, astigmatic field curves and a distortion curve of the image capturing unit according to the 7th embodiment. In FIG. 19 and FIG. 20, the identification module includes the imaging lens system (its reference numeral is omitted) of the present disclosure, an optical window 750, a cover glass 760 and an image sensor 780. The imaging lens system includes, in order from an object side to an image side, a first lens element 710, a second lens element 720, an aperture stop 700, a third lens element 730, a stop 701, a fourth lens element 740 and an image surface 770. The imaging lens system includes four lens elements (710, 720, 730 and 740) with no additional lens element disposed between each of the adjacent four lens elements.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has two inflection points. The image-side surface 712 of the first lens element 710 has three inflection points. The object-side surface 711 of the first lens element 710 has at least one convex critical point and at least one concave critical point in an off-axis region thereof.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric. The object-side surface 721 of the second lens element 720 has two inflection points. The image-side surface 722 of the second lens element 720 has one inflection point.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has one inflection point.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has one inflection point.

The optical window 750 is a light-permeable substrate and located between the imaged object O and the first lens element 710 (i.e., the object side of the first lens element 710), and will not affect the focal length of the imaging lens system. The cover glass 760 is a glass panel and located between the fourth lens element 740 and the image surface 770 (i.e., the image side of the fourth lens element 740), and will not affect the focal length of the imaging lens system. The image sensor 780 is disposed on or near the image surface 770 of the imaging lens system.

The detailed optical data of the 7th embodiment are shown in Table 13 and the aspheric surface data are shown in Table 14 below.

TABLE 13

7th Embodiment
f = 0.35 mm, Fno(work) = 1.36, Fno(inf.) = 1.32, HFOV = 60.2 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Optical Window | Plano | | 1.500 | — | 1.520 | 64.2 | — |
| 2 | | Plano | | 0.523 | | | | |
| 3 | Lens 1 | 0.834 | (ASP) | 0.464 | Plastic | 1.538 | 55.9 | −1.11 |
| 4 | | 0.280 | (ASP) | 0.955 | | | | |
| 5 | Lens 2 | −4.837 | (ASP) | 0.224 | Plastic | 1.548 | 56.0 | 14.01 |
| 6 | | −3.016 | (ASP) | 0.315 | | | | |
| 7 | Ape. Stop | Plano | | −0.007 | | | | |
| 8 | Lens 3 | 6.358 | (ASP) | 0.255 | Plastic | 1.548 | 56.0 | 2.66 |
| 9 | | −1.861 | (ASP) | 0.047 | | | | |
| 10 | Stop | Plano | | 0.009 | | | | |
| 11 | Lens 4 | 0.810 | (ASP) | 0.523 | Plastic | 1.548 | 56.0 | 0.76 |
| 12 | | −0.669 | (ASP) | 0.300 | | | | |
| 13 | Cover Glass | Plano | | 0.145 | Glass | 1.520 | 64.2 | — |
| 14 | | Plano | | 0.247 | | | | |
| 15 | Image | Plano | | — | | | | |

Note: Reference wavelength is 525 nm.
The working distance is the axial distance (2.023 mm) between the imaged object O (Surface 0) and the object-side surface 711 (Surface 3).
An effective radius of the stop 701 (Surface 10) is 0.390 mm.

TABLE 14

Aspheric Coefficients

| Surface # | 3 | 4 | 5 | 6 |
|---|---|---|---|---|
| k = | −1.0000E+00 | −1.0000E+00 | 0.0000E+00 | 0.0000E+00 |
| A4 = | −1.5120E+00 | −3.6890E+00 | −5.2868E+00 | −7.2318E+00 |
| A6 = | 1.8619E+00 | −8.3761E−01 | 4.0167E+01 | 1.5824E+02 |
| A8 = | −1.3707E+00 | 3.0868E+01 | −1.1558E+02 | −1.7664E+03 |
| A10 = | 6.4843E−01 | −8.4443E+01 | 1.2203E+01 | 1.4694E+04 |
| A12 = | −1.9812E−01 | 1.1594E+02 | 7.9599E+02 | −8.3943E+04 |
| A14 = | 3.7781E−02 | −8.9738E+01 | −1.9129E+03 | 3.0705E+05 |
| A16 = | −4.0814E−03 | 3.7135E+01 | 1.4446E+03 | −5.0104E+05 |
| A18 = | 1.9025E−04 | −6.3720E+00 | — | — |

| Surface # | 8 | 9 | 11 | 12 |
|---|---|---|---|---|
| k = | 0.0000E+00 | 1.3901E+01 | −8.3036E+00 | −2.8791E−01 |
| A4 = | 7.8086E−01 | −7.4505E−01 | −1.9964E+00 | 5.4660E+00 |
| A6 = | 2.0753E+01 | 9.1144E+01 | 7.1667E+01 | −1.1701E+02 |
| A8 = | 1.0091E+03 | −3.3947E+03 | −1.3660E+03 | 1.7291E+03 |
| A10 = | −3.9119E+04 | 6.5236E+04 | 1.4379E+04 | −1.5895E+04 |
| A12 = | 5.5079E+05 | −6.3256E+05 | −8.6829E+04 | 9.1146E+04 |
| A14 = | −3.5005E+06 | 3.0369E+06 | 2.9598E+05 | −3.2582E+05 |
| A16 = | 8.4437E+06 | −5.6447E+06 | −5.2497E+05 | 7.0353E+05 |
| A18 = | — | — | 3.7373E+05 | −8.4064E+05 |
| A20 = | — | — | — | 4.2965E+05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.35 | (OL − CTf)/(BL − CTr) | 0.96 |
| Fno(work) | 1.36 | SL/TL | 0.44 |
| Fno(inf.) | 1.32 | TL/f | 9.92 |
| HFOV [deg.] | 60.2 | ImgH/f | 1.65 |
| CT1/CT2 | 2.07 | TL [mm] | 3.48 |
| ATmax/CTmin | 4.26 | TL/ImgH | 5.99 |
| (R7 + R8)/(R7 − R8) | 0.10 | Y12/R2 | 3.70 |
| |f1/f2| | 0.08 | SAG12/R2 | 2.42 |
| |f4/f2| | 0.05 | Vmax − Vmin | 0.1 |
| |f/f1| − |f/f2| − |f/f3| | 0.16 | f/[EPD × tan(HFOV)] | 0.76 |

-continued

| 7th Embodiment | | | |
|---|---|---|---|
| f/EPD | 1.32 | Y11cx/Y11ca | 1.82 |
| CTf/TD | 0.54 | Y11/Y42 | 3.62 |

8th Embodiment

Figure 22:
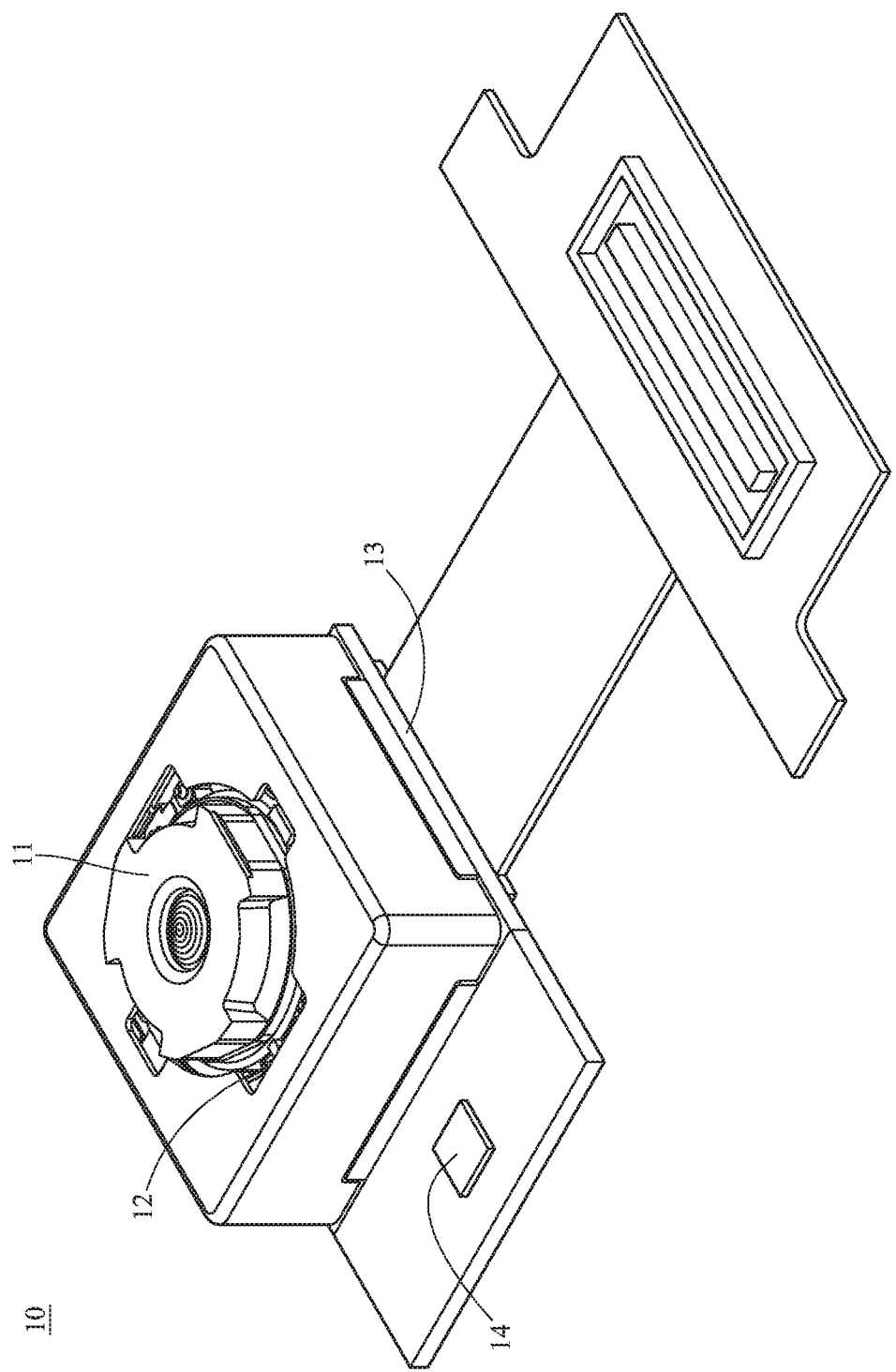
FIG. 22 is a perspective view of an image capturing unit according to the 8th embodiment of the present disclosure.

FIG. 22 is a perspective view of an image capturing unit according to the 8th embodiment of the present disclosure. In this embodiment, an image capturing unit 10 is a camera module including a lens unit 11, a driving device 12, an image sensor 13 and an image stabilizer 14. The lens unit 11 includes the imaging lens system disclosed in the 1st embodiment, a barrel and a holder member (their reference numerals are omitted) for holding the imaging lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

9th Embodiment

Figure 23:
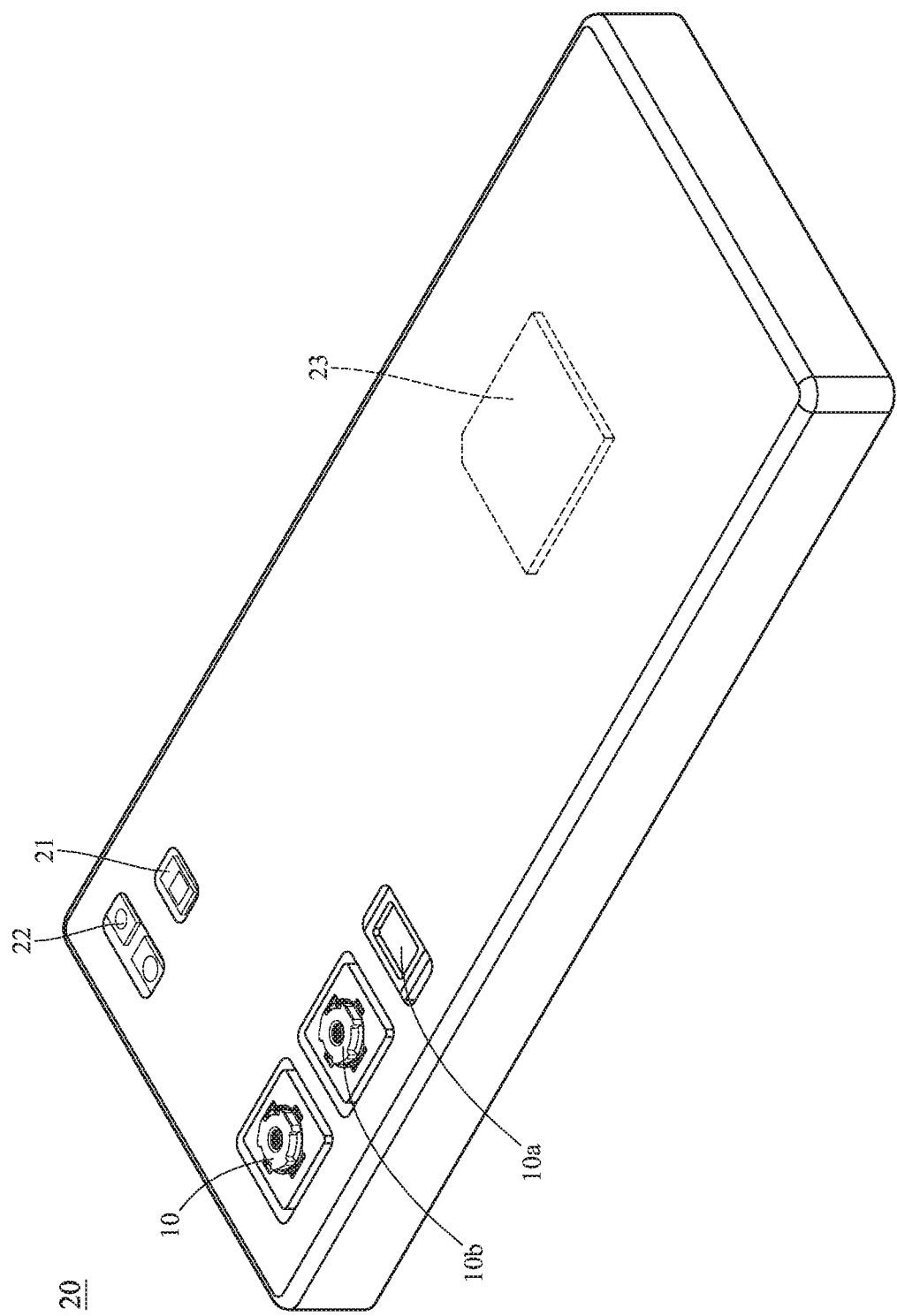
FIG. 23 is one perspective view of an electronic device according to the 9th embodiment of the present disclosure.
Figure 24:
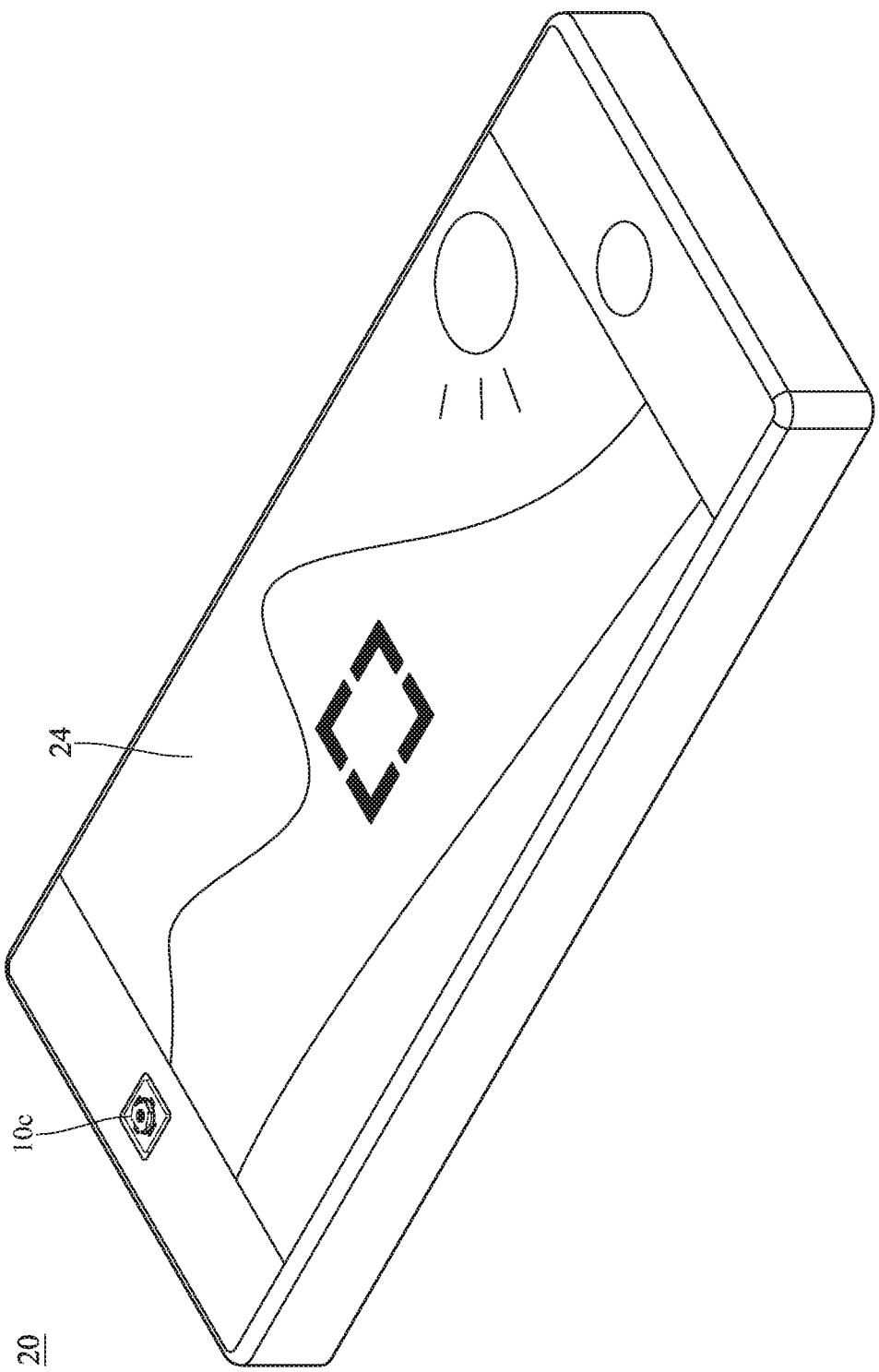
FIG. 24 is another perspective view of the electronic device in FIG. 23.
Figure 25:
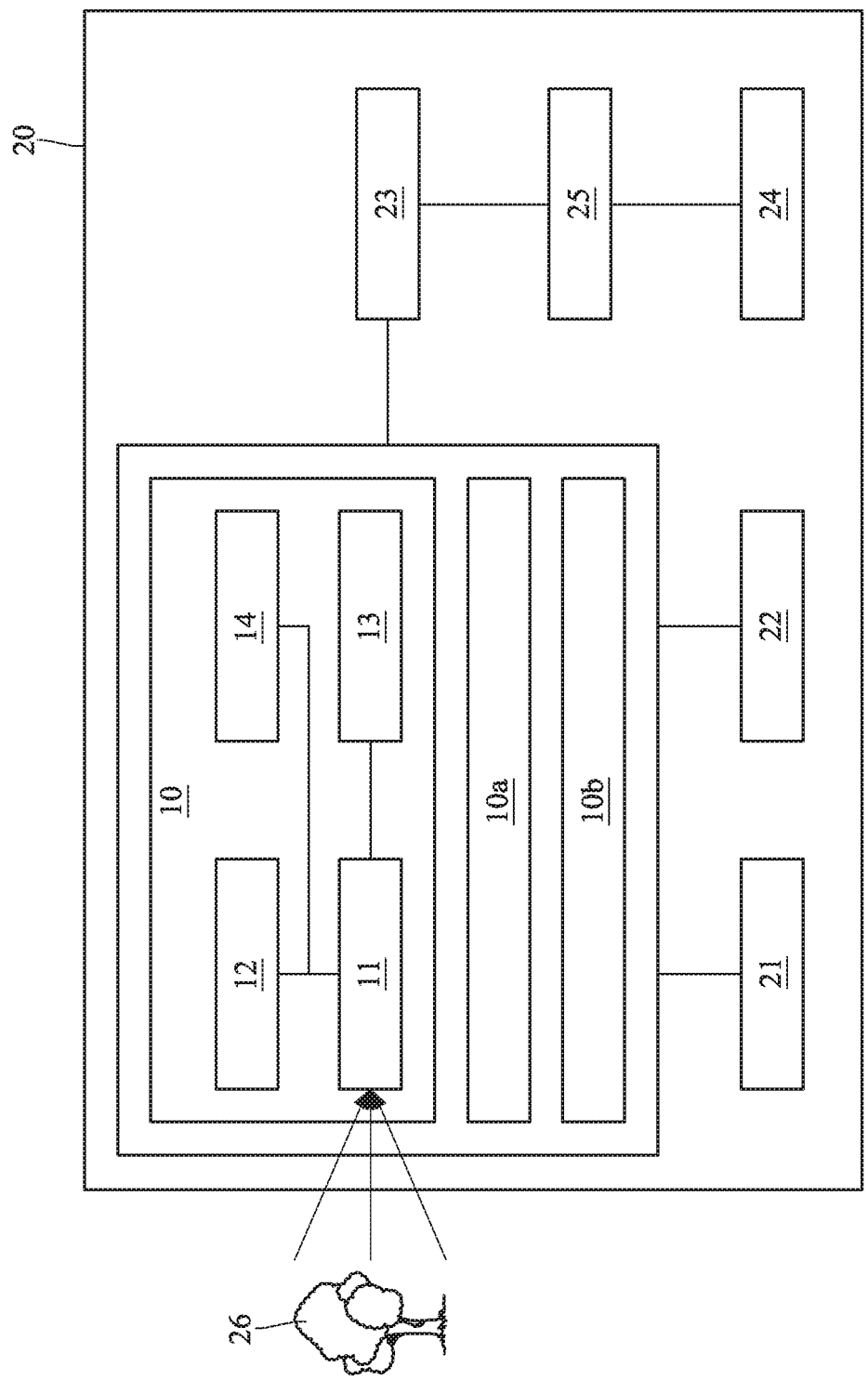
FIG. 25 is a block diagram of the electronic device in FIG. 23.

FIG. 23 is one perspective view of an electronic device according to the 9th embodiment of the present disclosure. FIG. 24 is another perspective view of the electronic device in FIG. 23. FIG. 25 is a block diagram of the electronic device in FIG. 23.

In this embodiment, an electronic device 20 is a smartphone including the image capturing unit 10 disclosed in the 8th embodiment, an image capturing unit 10a, an image capturing unit 10b, an image capturing unit 10c, a flash module 21, a focus assist module 22, an image signal processor 23, a user interface 24 and an image software processor 25. The image capturing unit 10c is located on the same side as the user interface 24, and the image capturing unit 10, the image capturing unit 10a and the image capturing unit 10b are located on the opposite side. The image capturing unit 10, the image capturing unit 10a and the image capturing unit 10b all face the same direction. Furthermore, the image capturing unit 10a, the image capturing unit 10b and the image capturing unit 10c all have a configuration similar to that of the image capturing unit 10. In detail, each of the image capturing unit 10a, the image capturing unit 10b and the image capturing unit 10c includes a lens unit, a driving device, an image sensor and an image stabilizer, and the lens unit includes a lens assembly, a barrel and a holder member for holding the lens assembly.

In this embodiment, the image capturing unit 10a is a telephoto image capturing unit and the image capturing unit 10b is an ultra-wide-angle image capturing unit. The image capturing unit 10 has a field of view ranging between that of the image capturing unit 10a and the image capturing unit 10b. The image capturing units 10, 10a, 10b have different fields of view, such that the electronic device 20 has various magnification ratios so as to meet the requirement of optical zoom functionality. In this embodiment, the electronic device 20 includes multiple image capturing units 10, 10a, 10b and 10c, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the electronic device 20 can capture images of the object 26 via the image capturing unit 10c. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices. In addition, the imaging lens system of the present disclosure can not only be applied to the image capturing applications as described above, but also be applied to image identification applications.

10th Embodiment

Figure 26:
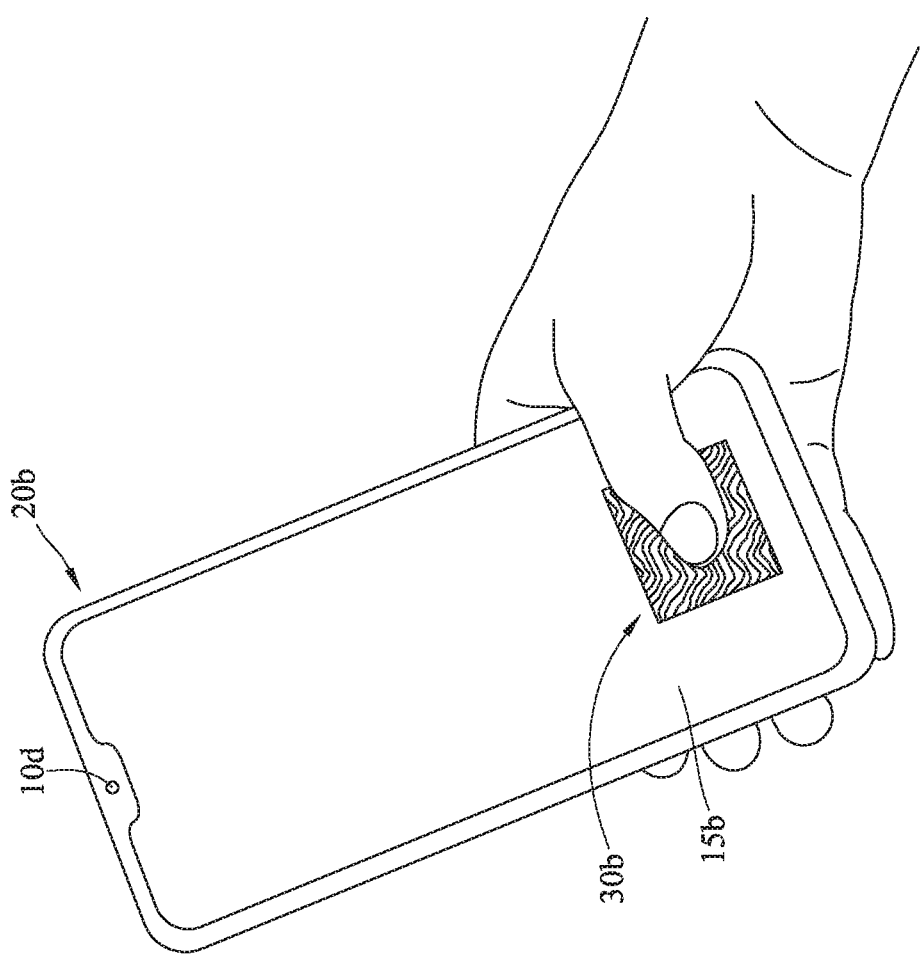
FIG. 26 is a perspective view of an electronic device according to the 10th embodiment of the present disclosure.
Figure 27:
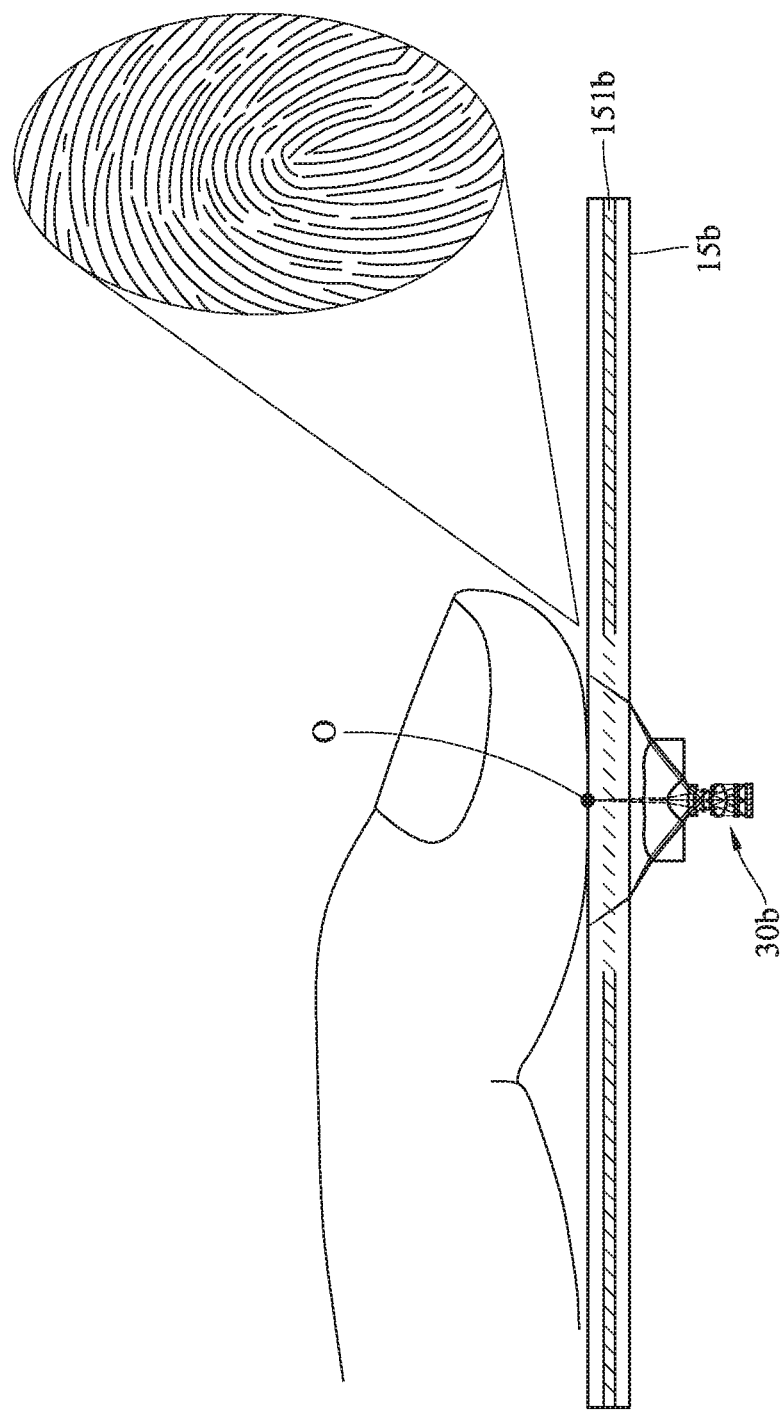
FIG. 27 is a schematic view of the electronic device in FIG. 26 identifying a fingerprint.

FIG. 26 is a perspective view of an electronic device according to the 10th embodiment of the present disclosure. FIG. 27 is a schematic view of the electronic device in FIG. 26 identifying a fingerprint.

In this embodiment, an electronic device 20b is a smartphone having a biometric identification function. The electronic device 20b includes an image capturing unit 10d and an identification module 30b. The image capturing unit 10d is a front-facing camera of the electronic device 20b for taking selfies, and the image capturing unit 10d includes the imaging lens system of the present disclosure and an image sensor.

The identification module 30b has a fingerprint identification function, which includes the imaging lens system of the present disclosure, an image sensor and a panel (optical window) 15b. The panel 15b is disposed between the imaged object O and the imaging lens system, and the panel 15b can be a display module. The display module includes a display layer 151b and a display substrate, and the display module can provide protection to the screen and thus minimize the use of additional components. Light rays can travel through the display layer 151b into the imaging lens system of the identification module 30b for wider applications. The display layer 151b has a touch-screen function, such that there is no need of additional input devices, and it's favorable for making the operation more intuitive. Furthermore, the display layer 151b may be an OLED display layer or an active-matrix organic light-emitting diode (AMOLED) display layer, such that the display layer 151b can be a light source for illuminating the imaged object O, thereby saving additional light sources.

In this embodiment, the imaging lens system and the display module of the identification module 30b and the image capturing unit 10d all face the same direction so as to use the display module as a light source for the imaging lens system of the identification module 30b, but the present disclosure is not limited thereto. In some configurations, the image capturing unit and the display module of the identification module may be located on opposite sides of the electronic device. In addition, in this embodiment, each of the image capturing unit 10d and the identification module 30b includes the imaging lens system of the present disclosure, but the present disclosure is not limited thereto. For example, in some configurations, only one of the image capturing unit 10d and the identification module 30b includes the imaging lens system of the present disclosure.

Figure 28:
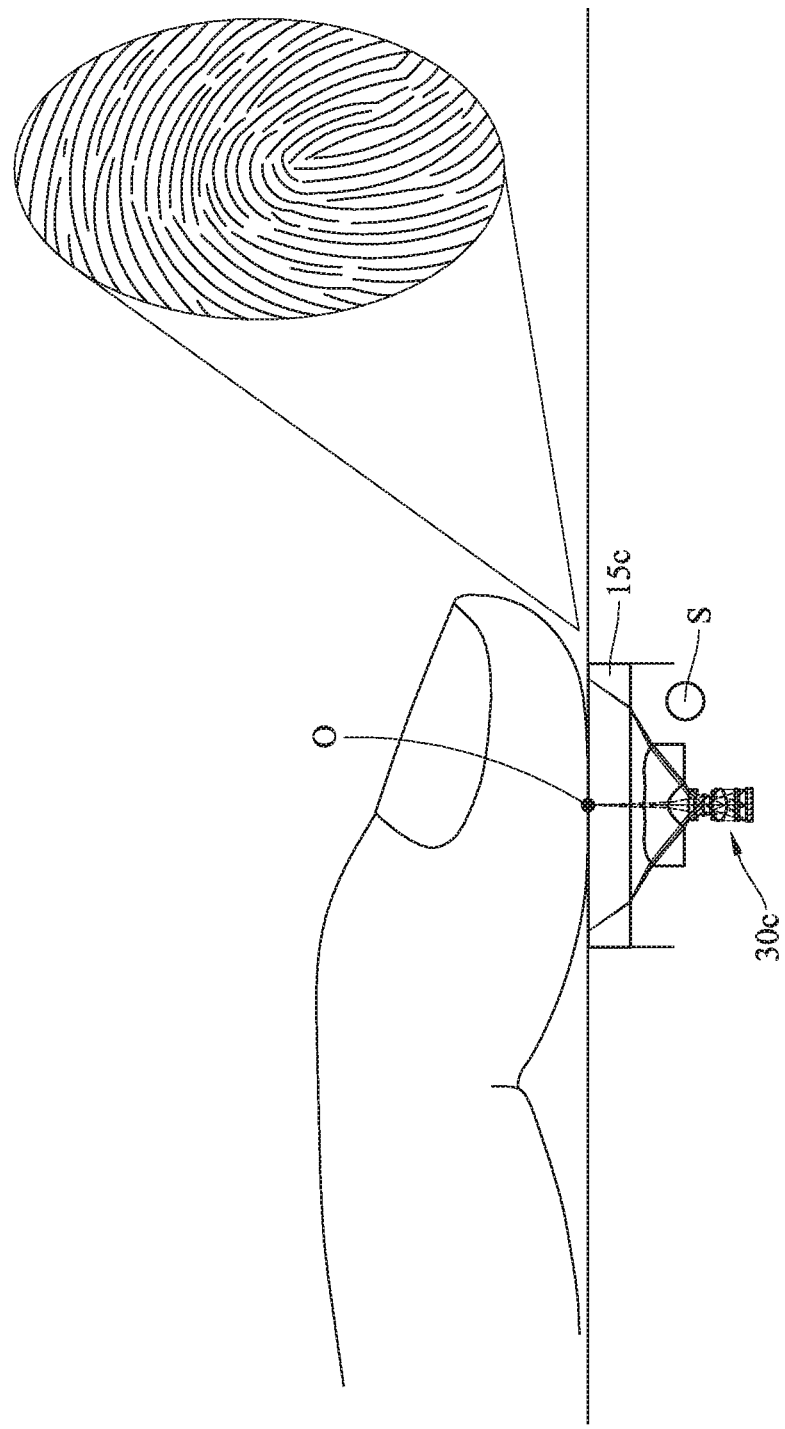
FIG. 28 is a schematic view of an electronic device according to another embodiment of the present disclosure identifying a fingerprint.

The electronic device of the present disclosure is not limited to the above configuration. FIG. 28 is a schematic view of an electronic device according to another embodiment of the present disclosure identifying a fingerprint. In this embodiment, the electronic device includes an identification module 30c. The identification module 30c has a fingerprint identification function and includes the imaging lens system of the present disclosure, an image sensor, a light source S and a panel (optical window) 15c. The panel 15c is disposed between the imaged object O and the imaging lens system, and the panel 15c can be a glass substrate. The light source S is disposed on one side of the imaging lens system for illuminating the imaged object O. Light rays from the imaged object O can travel through the panel 15c into the imaging lens system of the identification module 30c. In this embodiment, the identification module 30c includes the imaging lens system disclosed in the 1st embodiment, but the present disclosure is not limited thereto.

According to the present disclosure, the imaging lens system of the identification module features good capability in aberration corrections and high image quality, and the identification module can be applied to smartphones for under-display fingerprint identification, but the present disclosure is not limited thereto. For example, the identification module can be applied to other biometric identification applications such as iris and face identifications.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising four lens elements, the four lens elements being, in order from an object side to an image side, a first lens element, a second lens element, a third lens element and a fourth lens element; each of the four lens elements having an object-side surface facing toward the object side and an image-side surface facing toward the image side;
wherein the imaging lens system has a total of four lens elements, the first lens element has negative refractive power, the fourth lens element has positive refractive power, the image-side surface of the fourth lens element is convex in a paraxial region thereof, and at least one lens element of the imaging lens system has at least one lens surface having at least one inflection point;
wherein a central thickness of the first lens element is CT1, a central thickness of the second lens element is CT2, a focal length of the first lens element is f1, a focal length of the second lens element is f2, a maximum value among Abbe numbers of all lens elements of the imaging lens system is Vmax, a minimum value among Abbe numbers of all lens elements of the imaging lens system is Vmin, and the following conditions are satisfied:

$2.35 < CT1/CT2 < 7.50;$ $|f1| < |f2|;$ and $0 \le Vmax - Vmin < 10.0.$

2. The imaging lens system of claim 1, wherein the object-side surface of the fourth lens element is convex in a paraxial region thereof, and at least one of the object-side surface and the image-side surface of the fourth lens element has at least one inflection point.

3. The imaging lens system of claim 1, wherein the focal length of the first lens element is f1, the focal length of the second lens element is f2, a focal length of the third lens element is f3, and the following conditions are satisfied:

$|f1| < |f3|;$ and $|f1/f2| < 0.50.$

4. The imaging lens system of claim 1, wherein a maximum effective radius of the image-side surface of the first lens element is Y12, a curvature radius of the image-side surface of the first lens element is R2, and the following condition is satisfied:

$1.50 < Y12/R2 < 5.50.$

5. The imaging lens system of claim 1, further comprising an aperture stop, wherein the focal length of the second lens element is f2, a focal length of the fourth lens element is f4, an axial distance between the aperture stop and an image surface is SL, an axial distance between the object-side surface of the first lens element and the image surface is TL, and the following conditions are satisfied:

|f4/f2|<0.50; and 0.25<SL/TL<0.60.

6. An identification module, comprising:
the imaging lens system of claim 1;
a panel disposed on an object side of the first lens element of the imaging lens system, wherein an axial distance between the panel and the first lens element is smaller than 0.90 mm; and
an image sensor disposed on an image surface of the imaging lens system.

7. An imaging lens system comprising four lens elements, the four lens elements being, in order from an object side to an image side, a first lens element, a second lens element, a third lens element and a fourth lens element; each of the four lens elements having an object-side surface facing toward the object side and an image-side surface facing toward the image side;
wherein the imaging lens system has a total of four lens elements, the first lens element has negative refractive power, the object-side surface of the first lens element is convex in a paraxial region thereof, the image-side surface of the first lens element is concave in a paraxial region thereof, the fourth lens element has positive refractive power, the image-side surface of the fourth lens element is convex in a paraxial region thereof, and at least one lens element of the imaging lens system has at least one lens surface having at least one inflection point;
wherein a central thickness of the first lens element is CT1, a central thickness of the second lens element is CT2, a focal length of the imaging lens system is f, a focal length of the first lens element is f1, a focal length of the second lens element is f2, an axial distance between the object-side surface of the first lens element and an image surface is TL, and the following conditions are satisfied:

1.20<CT1/CT2<15.0;

|f1|<|f2|;

5.50<TL/f<16.0; and

TL<4.50 [mm].

8. The imaging lens system of claim 7, wherein the focal length of the second lens element is f2, a focal length of the fourth lens element is f4, and the following condition is satisfied:

|f4|<|f2|.

9. The imaging lens system of claim 7, wherein the focal length of the imaging lens system is f, an entrance pupil diameter of the imaging lens system is EPD, an incident angle of a chief ray at a maximum field of view on the object-side surface of the first lens element relative to an optical axis is HFOV, and the following condition is satisfied:

0<f/[EPD×tan(HFOV)]<1.0.

10. The imaging lens system of claim 7, wherein the object-side surface of the first lens element has at least one inflection point, the imaging lens system is operated within a wavelength range of 480 nm to 590 nm, the axial distance between the object-side surface of the first lens element and the image surface is TL, a maximum image height of the imaging lens system is ImgH, and the following condition is satisfied:

5.0<TL/ImgH<10.0.

11. The imaging lens system of claim 7, wherein each of the four lens elements has an Abbe number larger than 50.0.

12. The imaging lens system of claim 7, wherein a vertical distance between a non-axial convex critical point on the object-side surface of the first lens element and an optical axis is Y11cx, a vertical distance between a non-axial concave critical point on the object-side surface of the first lens element and the optical axis is Y11 ca, and the following condition is satisfied:

1.10<Y11cx/Y11ca<3.20.

13. An identification module, comprising:
the imaging lens system of claim 7;
a first panel disposed on an object side of the first lens element of the imaging lens system;
a second panel disposed on an image side of the fourth lens element of the imaging lens system; and
an image sensor disposed on the image surface of the imaging lens system;
wherein an axial distance between an imaged object and the object-side surface of the first lens element is OL, a central thickness of the first panel is CTf, an axial distance between the image-side surface of the fourth lens element and the image surface is BL, a central thickness of the second panel is CTr, and the following condition is satisfied:

(OL−CTf)/(BL−CTr)<1.80.

14. An imaging lens system comprising four lens elements, the four lens elements being, in order from an object side to an image side, a first lens element, a second lens element, a third lens element and a fourth lens element; each of the four lens elements having an object-side surface facing toward the object side and an image-side surface facing toward the image side;
wherein the imaging lens system has a total of four lens elements, the first lens element has negative refractive power, the fourth lens element has positive refractive power, and at least one lens element of the imaging lens system has at least one lens surface having at least one inflection point;
wherein a central thickness of the first lens element is CT1, a central thickness of the second lens element is CT2, a focal length of the imaging lens system is f, a focal length of the first lens element is f1, a focal length of the second lens element is f2, an axial distance between the object-side surface of the first lens element and an image surface is TL, an entrance pupil diameter of the imaging lens system is EPD, and the following conditions are satisfied:

1.20<CT1/CT2<15.0;

|f1|<|f2|;

5.50<TL/f<14.0;

f/EPD<1.90; and

TL<4.50 [mm].

15. The imaging lens system of claim 14, wherein the object-side surface of the first lens element is convex in a paraxial region thereof, and the object-side surface of the first lens element has a convex-to-concave-to-convex shape change in order from the paraxial region thereof to an off-axis region thereof.

16. The imaging lens system of claim 14, wherein a maximum value among Abbe numbers of all lens elements of the imaging lens system is Vmax, a minimum value among Abbe numbers of all lens elements of the imaging lens system is Vmin, and the following condition is satisfied:

0<Vmax−Vmin<10.0.

17. The imaging lens system of claim 14, wherein the focal length of the imaging lens system is f, the focal length of the first lens element is f1, the focal length of the second lens element is f2, a focal length of the third lens element is f3, the axial distance between the object-side surface of the first lens element and the image surface is TL, a maximum image height of the imaging lens system is ImgH, and the following conditions are satisfied:

0<|f/f1|−|f/f2|−|f/f3|; and 5.0<TL/ImgH<8.0.

18. The imaging lens system of claim 14, wherein the focal length of the imaging lens system is f, the entrance pupil diameter of the imaging lens system is EPD, an incident angle of a chief ray at a maximum field of view on the object-side surface of the first lens element relative to an optical axis is HFOV, and the following condition is satisfied:

0<f/[EPD×tan(HFOV)]<1.0.

19. The imaging lens system of claim 14, further comprising an aperture stop, wherein the focal length of the first lens element is f1, the focal length of the second lens element is f2, an axial distance between the aperture stop and the image surface is SL, the axial distance between the object-side surface of the first lens element and the image surface is TL, and the following conditions are satisfied:

|f1/f2|<0.50; and 0.25<SL/TL<0.60.

20. The imaging lens system of claim 14, wherein an axial distance between the first lens element and the second lens element is a maximum among axial distances between each of all adjacent lens elements of the imaging lens system, a maximum image height of the imaging lens system is ImgH, the focal length of the imaging lens system is f, and the following condition is satisfied:

1.20<ImgH/f<3.0.

21. The imaging lens system of claim 14, wherein the central thickness of the first lens element is a maximum among central thickness of all lens elements of the imaging lens system.

22. An identification module, comprising:
the imaging lens system of claim 14;
a panel disposed on an object side of the first lens element of the imaging lens system; and
an image sensor disposed on the image surface of the imaging lens system;
wherein a central thickness of the panel is CTf, an axial distance between the object-side surface of the first lens element and the image-side surface of the fourth lens element of the imaging lens system is TD, and the following condition is satisfied:

0.35<CTf/TD<0.70.

23. An electronic device, comprising:
the identification module of claim 22;
wherein the panel of the identification module is a display module, and the imaging lens system and the display module of the identification module face the same direction.

24. An identification module comprising, in order from an object side to an image side: a panel, an imaging lens system and an image sensor, wherein the imaging lens system comprises four lens elements, the four lens elements are, in order from the object side to the image side, a first lens element, a second lens element, a third lens element and a fourth lens element, and each of the four lens elements has an object-side surface facing toward the object side and an image-side surface facing toward the image side;
wherein the imaging lens system has a total of four lens elements, the first lens element has negative refractive power, the fourth lens element has positive refractive power, at least one lens element of the imaging lens system has at least one lens surface having at least one inflection point, and the image sensor is disposed on an image surface of the imaging lens system;
wherein the imaging lens system further comprises an aperture stop, a central thickness of the first lens element is CT1, a central thickness of the second lens element is CT2, a focal length of the imaging lens system is f, a focal length of the first lens element is f1, a focal length of the second lens element is f2, an entrance pupil diameter of the imaging lens system is EPD, a curvature radius of the object-side surface of the fourth lens element is R7, a curvature radius of the image-side surface of the fourth lens element is R8, a central thickness of the panel is CTf, an axial distance between the object-side surface of the first lens element and the image-side surface of the fourth lens element is TD, an axial distance between the aperture stop and the image surface is SL, an axial distance between the object-side surface of the first lens element and the image surface is TL, and the following conditions are satisfied:

1.20<CT1/CT2<15.0;

|f1|<|f2|;

f/EPD<1.90;

−1.0<(R7+R8)/(R7−R8);

0.25<CTf/TD<1.50; and 0.35<SL/TL<0.50.

25. The identification module of claim 24, wherein the object-side surface of the first lens element is convex in a paraxial region thereof, the object-side surface of the first lens element has a convex-to-concave-to-convex shape change in order from the paraxial region thereof to an off-axis region thereof, a focal length of the third lens element is f3, a focal length of the fourth lens element is f4, and the following condition is satisfied:

|f4|<|f3|.

26. The identification module of claim 24, wherein the curvature radius of the object-side surface of the fourth lens element is R7, the curvature radius of the image-side surface of the fourth lens element is R8, and the following condition is satisfied:

−0.50<(R7+R8)/(R7−R8)<0.50.

27. The identification module of claim 24, wherein a displacement in parallel with an optical axis from an axial vertex to a maximum effective radius position on the image-side surface of the first lens element is SAG12, a curvature radius of the image-side surface of the first lens element is R2, and the following condition is satisfied:

$1.20 < SAG12/R2 < 5.50.$

28. The identification module of claim 24, wherein a maximum effective radius of the object-side surface of the first lens element is Y11, a maximum effective radius of the image-side surface of the fourth lens element is Y42, a maximum value among axial distances between each of all adjacent lens elements of the imaging lens system is ATmax, a minimum value among central thicknesses of all lens elements of the imaging lens system is CTmin, and the following conditions are satisfied:

$3.0 < Y11/Y42 < 6.0;$ and $3.0 < ATmax/CTmin < 5.0.$

* * * * *